(12) United States Patent
Ballew et al.

(10) Patent No.: US 12,271,937 B1
(45) Date of Patent: Apr. 8, 2025

(54) ECOLOGICAL IMPACT EVALUATION PROMOTING DECREASED ECOLOGICAL IMPACT

(71) Applicant: UIPCO, LLC, San Antonio, TX (US)

(72) Inventors: Rachel Michelle Ballew, San Antonio, TX (US); Hanna Elizabeth Rafferty, San Antonio, TX (US); Jeorge Luis Fabre, San Antonio, TX (US); Gregory Brian Meyer, San Antonio, TX (US); Stacy Callaway Huggar, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 145 days.

(21) Appl. No.: 17/818,036

(22) Filed: Aug. 8, 2022

(51) Int. Cl.
*G06Q 30/0601* (2023.01)
*G06Q 30/018* (2023.01)

(52) U.S. Cl.
CPC ....... *G06Q 30/0631* (2013.01); *G06Q 30/018* (2013.01)

(58) Field of Classification Search
CPC .......................... G06Q 30/0631; G06Q 30/018
See application file for complete search history.

(56) References Cited

U.S. PATENT DOCUMENTS

| | | | |
|---|---|---|---|
| 6,138,127 A | 10/2000 | Pasch | |
| 8,606,633 B2 | 12/2013 | Tarbert et al. | |
| 10,526,771 B1 * | 1/2020 | Devereaux | E03B 7/003 |
| 2012/0239211 A1 * | 9/2012 | Walker | G05B 13/021 |
| | | | 700/284 |
| 2014/0122419 A1 * | 5/2014 | Ezov | G06Q 10/00 |
| | | | 707/E17.005 |
| 2016/0078414 A1 | 3/2016 | Rathore et al. | |
| 2017/0351978 A1 * | 12/2017 | Bellowe | G06Q 50/01 |
| 2018/0016096 A1 | 1/2018 | Krishnamurthy et al. | |
| 2019/0005507 A1 * | 1/2019 | Rodoni | B09B 1/00 |
| 2019/0218153 A1 | 7/2019 | Price | |
| 2022/0301299 A1 | 9/2022 | Decker et al. | |

OTHER PUBLICATIONS

Wang et al., "Classification for Plastic Bottles Recycling based on Image Recognition", Waste Management, vol. 88, pp. 170-181, 2019.

* cited by examiner

*Primary Examiner* — A. Hunter Wilder

(74) *Attorney, Agent, or Firm* — Potomac Law Group, PLLC; Dannon G. Allbee

(57) ABSTRACT

Methods and systems described herein are directed to evaluating an individual's ecological impact to promote reductions for that impact. An ecological impact evaluator can automatically retrieve behavioral data of a user that the evaluator can assess for guiding the user with respect to one or more of product purchasing, water usage, recycling and composting procedures, and driving practices. In view of data collected, the evaluator can provide various recognitions for behavior that incentivize the user toward maintaining or improving current behaviors.

20 Claims, 15 Drawing Sheets

ECOLOGICAL IMPACT EVALUATION PROMOTING DECREASED ECOLOGICAL IMPACT

CROSS-REFERENCE TO RELATED APPLICATIONS

This application is related to U.S. patent application Ser. No. 17/818,024, titled "Ecological Impact Evaluation Promoting Decreased Ecological Impact," filed Aug. 8, 2022, which is herein incorporated by reference in its entirety.

TECHNICAL FIELD

The present disclosure is directed to automatic evaluation of an individual's ecological impact and coordinating computing systems to promote reduction of that impact.

BACKGROUND

As activities and goods throughout society increase in complexity, an ecological impact of engaging in those activities and using and disposing of those goods can also be likely to increase. This can be the case since it can be inevitable that the burning of fossil fuels (i.e., coal, oil, and natural gas) plays a role in such an increased impact due to emissions for the greenhouse gas, carbon dioxide ($CO_2$). In this regard, the U.S. Environmental Protection Agency reports 2020 greenhouse gas (GHG) emissions (measured as $CO_2$ equivalent ($CO_2e$)) in the following quantities: 27% for transportation, 13% for commercial and residential activity, 24% for industrial activity, 11% for agricultural events, and 25% for the production of electricity. Thus, it can be appreciated that, repetition for and changes in consumer travel regimens, consumer purchasing habits, and production methods for goods purchased, for example, can all affect amounts for $CO_2$ (herein "carbon") emissions.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
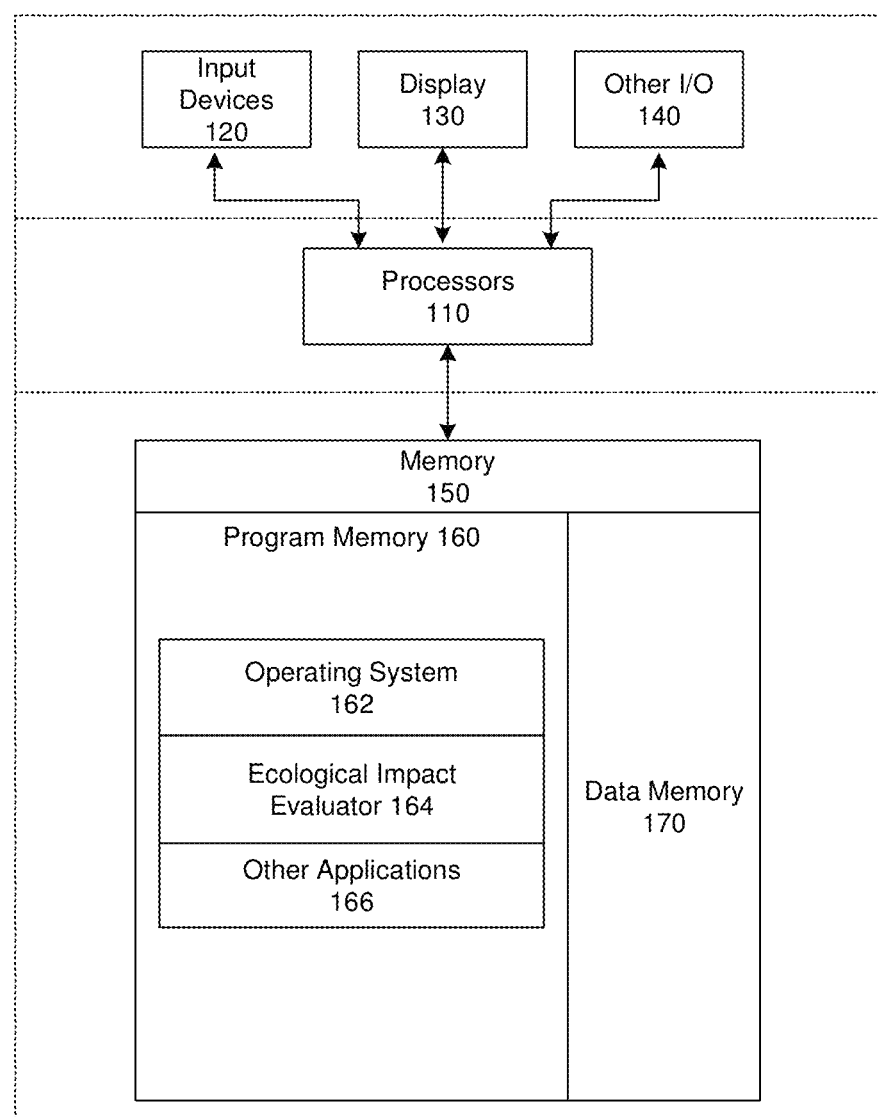
FIG. 1 is a block diagram illustrating an overview of devices on which some implementations can operate.

Aspects of the present disclosure are directed to automatically evaluating one or more behaviors of an individual that can effect an ecological impact for that individual and others. More particularly, such aspects are directed to, via an ecological impact evaluator according to implementations of the present technology, providing the individual ecological assessments for the behaviors and recommendations for future actions, e.g., based on data gathered about the user's actions and environment. In these regards, exemplary behaviors for the individual can include product purchasing, recycling and composting activity for one or more products and/or their product packaging configurations, driving practices, and water usage. Assessments for such types of behaviors can be directed to reducing a carbon contribution, pollution, resource utilization, etc. associated with the behaviors. For example, the assessments can include analyses as to whether a product being considered for purchase is recyclable or compostable, and, if so, how to recycle or compost that product and/or its product packaging configuration. In another example, an assessment of transportation options engaged by the individual can be a basis for one or more suggestions that can yield a lesser carbon contribution. Still further, implementations of the present technology can evaluate energy usage by an individual in that individual's home or business in order to inform about a carbon impact for that usage and to promote alternative energy usage patterns.

In an example implementation of the present technology, the ecological impact evaluator can be implemented via an application that can be executed on a smart device, where the device can generate one or more directions for recycling a product packaging configuration. For instance, one or more of the directions can be to recycle the configuration according to a recycling category determined according to an imaging of the configuration. In yet another example implementation of the present technology, the ecological impact evaluator can be implemented in conjunction with a user's browser (on a mobile or other stand-alone device) to, for example, enable the user to similarly evaluate product purchasing and retrieval (e.g., delivery or pick-up) with respect to associated carbon contributions. In still another example implementation, the evaluator can assess carbon contributions resulting from engaging in activities such as driving a particular type and size of one vehicle as opposed to another, being a passenger on public transportation as opposed to driving a personal vehicle when making a trip of a certain distance and duration.

In some implementations of the present technology, past, present, and future activities of a user can be recorded and scored according to their ecological impact. The scoring can then be used to promote future ecological behavior(s). As will be understood, these are just some of the ways the ecological impact evaluator can be a companion to its user in order to allow that user to maximize her efforts toward ecological stewardship.

Existing manners of evaluating ecological impact for activities engaged in by individuals, whether in terms of, for example, product purchasing and usage, selected transportation options, or otherwise, primarily rely on retrospective determinations for those activities. In other words, systems implementing evaluations for such activities can merely tally ecological impact (e.g., carbon contribution) according to a large-scale schema for modeling what that impact may be. Current systems can, for example, only gauge an individual's carbon contribution due to purchasing a particular product and then disposing of it, by referencing a catalogued description for materials that may or may not be applicable for that product. As a result, the existing systems can fail to appropriately measure one or more ecological impacts for activities engaged in by a user of such systems. Therefore, there can result further failure to provide any meaningful recommendations on how to manage those activities in the future in order to decrease a severity of ecological impact(s). By contrast, implementations of the present technology can provide "on the fly" assessments for choices relating to, for example, product purchasing and acquisition (e.g., delivery, pick-up), recycling, and other types of activities that can have ecological effects. In providing the assessments, an ecological impact evaluator can track its user's activities, invoke comparisons for those activities and then issue one or more recommendations that can be pertinent to improving corresponding ecological impact. As an example of the tracking yielding such comparison opportunities, the ecological impact evaluator can anticipate when one or more consumer products need to be replenished (e.g., via communication with another smart device, such as a smart refrigerator, that can detect depletion of those products), and then report retrieval options for achieving the replenishment. In some implementations, the tracking can be used to score such activities to promote continued user behavior. For instance, the evaluator can store prior product purchases for which ecological impact was scored as being low and present that purchase history to a user prior to a subsequent purchase of a similar purpose product. In another instance, and with regard to the above example for product replenishment, the evaluator can present to the user a least ecological impactful retrieval option. That is, when considering parameters such as the size and weight of new products as replenishments, the evaluator can assess whether delivery of such products to the user's house, walking to a central hub to pick up the products, or driving to a repository (e.g., a grocery store) in an electrically powered vehicle can lead to a lowest ecological impact score. As such, and unlike conventional systems, the ecological impact evaluator according to implementations of the present technology can provide real-time analyses for ecological impact that can be tailored to a user's specific activities, whether they be purchasing a product, taking one form of transportation over another, etc.

Several implementations are discussed below in more detail in reference to the figures. FIG. 1 is a block diagram illustrating an overview of devices on which some implementations of the disclosed technology can operate. The devices can comprise hardware components of a device 100 that can track a user's activities to evaluate ecological impact for those activities, and use that tracking to promote reducing such impacts. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, an ecological impact evaluator 164, and other application programs 166. Memory 150 can also include data memory 170, e.g., product purchase data, product location data, product purchase history, dwelling or business energy usage data, transportation data (including vehicle type, gasoline usage, etc.), water usage data for a dwelling or business, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
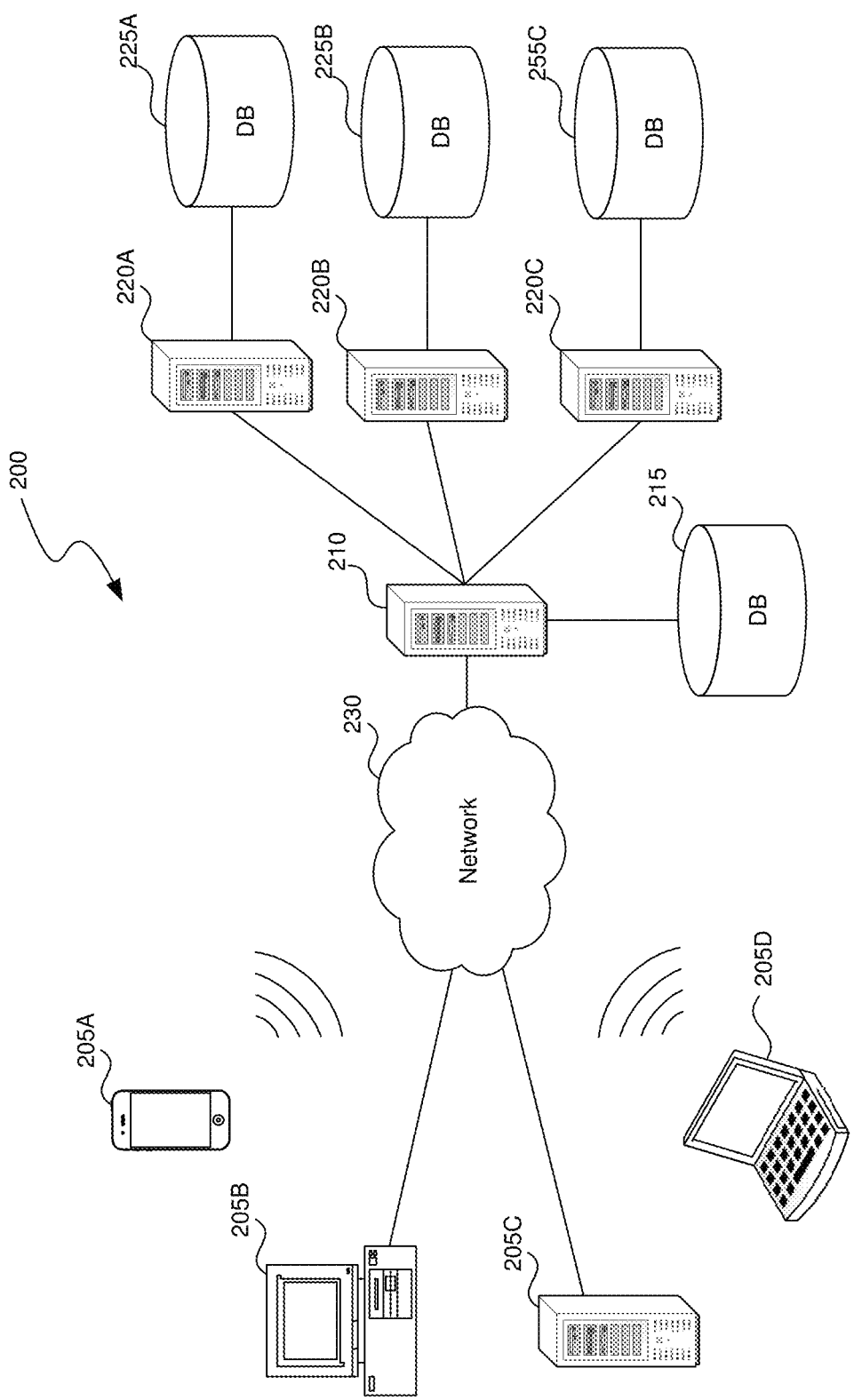
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as product packaging configurations, carbon emissions for producing and disposing of products, carbon emissions for carrying out certain activities (driving a vehicle, recycling a product, etc.), product types and categories that can be composted, water usage allocations and usage patterns for dwellings and businesses, ratings for carbon emissions due to activities, and ecological scores mapped to activities, together with recommendations for reducing ecological impact in view of a score. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
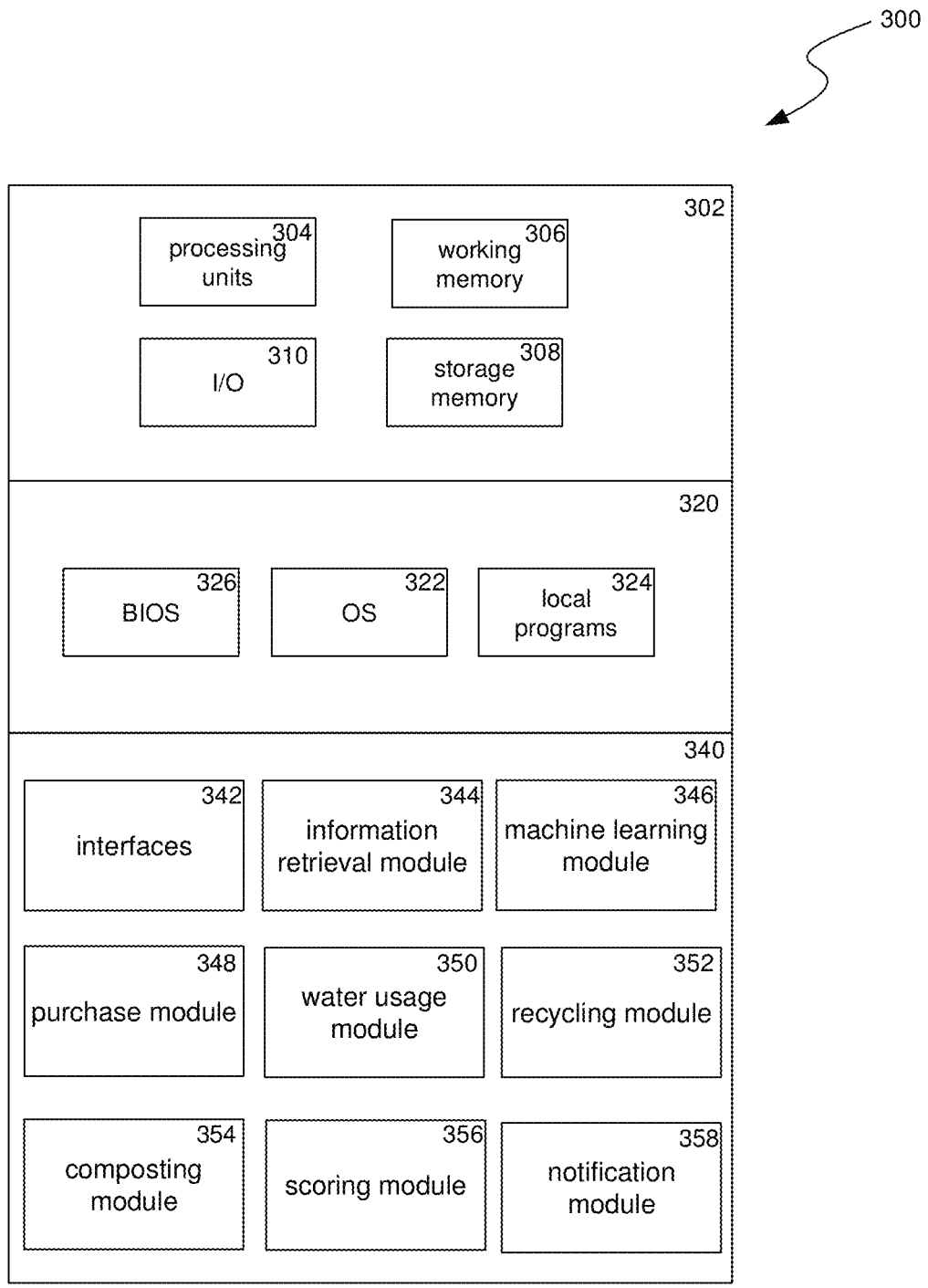
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include an information retrieval module 344, a machine learning module 346, a purchase module 348, a water usage module 350, a recycling module 352, a composting module 354, a scoring module 356, a notification module 358, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can retrieve information (herein "data") for a multitude of activities engaged in by a user of the ecological impact evaluator. For instance, such data can describe purchasing activities for one or more products that the user has purchased or is considering purchasing, including packaging configuration(s), date and quantities for the purchases or potential purchases, etc. In some implementations, the retrieved data can be simply a description of one or more products that have been in use and/or are desired by the user to be discarded. In yet other implementations, the information retrieval module 344 can retrieve data describing water or energy usage (amounts, usage times, patterns of usage, etc.) by a user of the ecological impact evaluator. In this regard, such energy usage can relate to operations for appliances (dishwashers, clothes washing and drying machines, etc.), and HVAC systems in the user's home or business. Still further, such energy usage can relate to operations for one or more of the user's vehicles (e.g., amounts of gasoline used leading to exhaust emissions caused by acceleration rates and patterns). In some implementations, data for one or more of the above activities can, assuming the user's permission to relinquish such data, be automatically retrieved by the ecological impact evaluator. For instance, the user can permission the evaluator to monitor and collect activity for online purchasing of products (e.g., via a browser extension). In another case, the user can affect the monitoring by installing one or more smart devices (e.g., a smart plug or infrared scanning system) in her home or business to track energy usage. In still another case, the user can allow for the aforementioned monitoring via location and motion detecting devices (GPS, accelerometers, inertia measurement units (IMUs), etc.) included in the user's vehicle and/or one or more wearables. In some implementations, the ecological impact evaluator can automatically obtain, from a smart device that can assist with recycling and composting procedures for the user, a frequency of recycling and composting activities. Additional details on the types of data that can be retrieved by information retrieval module 344 are provided below in relation to block 502 of FIG. 5, block 702 of FIG. 7, block 902 of FIG. 9, block 1102 of FIG. 11, and block 1302 of FIG. 13.

In some implementations, machine learning module 346 can intake one or more of the above types of data retrieved by information retrieval module 344 to determine one or more product characteristics of a product and/or its packaging configuration. As an example, such product characteristics can include one or more material compositions for a configuration of product packaging. As another example, the characteristics can define a composting candidacy for a product according to, for instance, a condition of use and material composition for the product. To carry out the determination, machine learning module 346 can convert the product packaging configuration and/or the condition of use and material composition for a product into machine learning model input. The machine learning module 346 can then apply item input to a trained machine learning model that can then generate material compositions and compost candidacies for products. Additional details on the determination of product characteristics by machine learning module 346 are provided below in relation to blocks 904, 906, and 908 of FIG. 9, and blocks 1104, 1106, and 1108 of FIG. 11.

In some implementations, purchase module 348 can, for a product purchasing history of the user, compare that history to other products that can correlate for a similar size, purpose, etc. to allow the user to obtain a same ecological benefit. In some implementations, purchase module 348 can examine prospective purchases of the user in order to suggest one or more products that can have a lesser ecological impact (e.g., are more recyclable). In some implementations, purchase module 348 can then provide recommendations for purchasing products that can assist the user in lowering her ecological impact. Additional details on the comparisons and examinations that can be performed and the recommendations provided by purchase module 348 are provided below in relation to blocks 504, 506, 508, and 510 of FIG. 5.

In some implementations, water usage module 350 can examine water usage patterns of the user to determine how those patterns relate to water allocations for the user's home or business. This way, the user can be provided with one or more recommendations as to how to curtail or schedule water consumption to yield an optimal ecological result.

Additional details on the types of examinations and recommendations provided by water usage module 350 are provided below in relation to blocks 704, 706, and 708 of FIG. 7.

In some implementations, recycling module 352 can, for product packaging configurations associated to a user, use the data retrieved by information retrieval module 344 in connection with determinations made by machine learning module 346. For example, recycling module 352 can use a mapping of material compositions for products to recycling categories in order to enable a selection of one or more recycling categories for corresponding product packaging configurations. As a result of the selection(s), recycling module 352 can then ascertain applicable recycling recommendations for one or more product packing configurations which are to be discarded by a user of ecological impact evaluator 164. Additional details on selections and recommendations for recycling of product packaging configurations are provided below in relation to blocks 910 and 912 of FIG. 9.

In some implementations, composting module 354 can, for one or more waste products, determine composting recommendations for respective compost candidacies. For example, composting module 354 can produce, using a waste product type retrieved by information retrieval module 344 and a compost candidacy generated by machine learning module 346, a composting recommendation for one or waste materials presented to the ecological impact evaluator 164. The recommendation can be the result of mapping for waste product types to composting methods. For instance, such a composting recommendation can be to discard of an oily product waste by submitting that waste to a vermicomposting process. Additional details on the types of determinations and recommendations that can be made by composting module are provided below in relation to block 1110 of FIG. 11.

In some implementations, scoring module 356 can score behaviors (e.g., patterns, habits) of a user corresponding to one or more of the types of data compiled by information retrieval module 344 to determine an ecological impact score of a user. In this regard, the score can be a result of assessments for past behaviors of a user as against current or proposed behaviors (e.g., prospective purchases). This way, scoring module 356 can arrive at a current ecological impact score that most accurately reflects a learned knowledge of a user with respect to how her behavior(s) can contribute to or detract from a relevant state of ecology (e.g., an ecological footprint for a global ecology). In some implementations, scoring module 356 can associate an award or recommendation that can promote a user's efforts to achieve a lessened ecological impact. Additional details on the types of scoring that can be performed by scoring module 356 are provided below in relation to blocks 1304, 1308, 1310, and 1312 of FIG. 13.

In some implementations, notification module 350 can notify a user of one or more recommendations for managing activities for which assessments were undertaken by information assessment module 348. As examples, such recommendations can include the purchase of a more recyclable product, the purchase of product that will entail a lesser carbon footprint (i.e., a measure of total GHG emissions from $CO_2$, methane ($CH_4$) and nitrous oxide ($N_2O$) measured as kilograms or metric tons of $CO_2$ equivalent ($CO_2e$)) as a result of it being produced in an area that is nearby the user, etc. In some implementations, notification module 350 can notify a user of her ecological impact score, where the score can, for instance, represent the user's carbon footprint.

Additional details on the types of notifications that can be issued by notification module are provided below in relation to block 512 of FIG. 5, block 710 of FIG. 7, block 914 of FIG. 9, block 1112 of FIG. 11, and block 1314 of FIG. 13.

Those skilled in the art will appreciate that the components illustrated in FIGS. 1-3 described above, and in each of the flow and conceptual diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
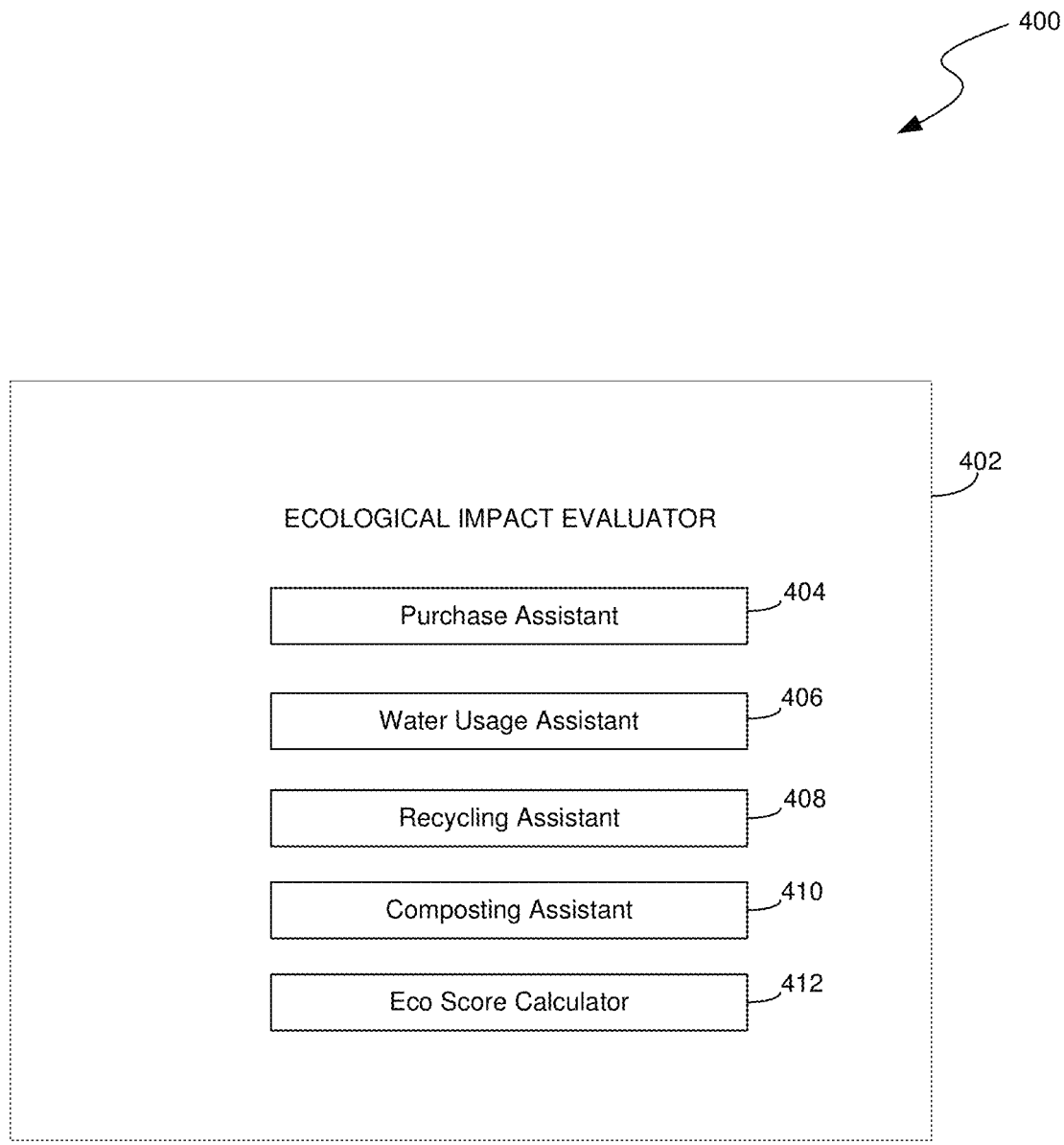
FIG. 4 is a conceptual diagram illustrating, according to implementations of the present technology, a user interface (UI) for an application executing an ecological impact evaluator.

FIG. 4 is a conceptual diagram 400 illustrating, according to implementations of the present technology, a user interface (UI) 402 for an application executing the ecological impact evaluator 164. As shown, the UI 402 can present a user of the ecological impact evaluator 164 various selections for enabling a user to track behaviors that can affect the user's ecological impact. For instance, a purchase assistant 404 can, as is explained with reference to FIGS. 5 and 6, assist the user in making ecologically beneficial purchasing decisions. Additionally, the UI 402 can provide the user with a water usage assistant 406 that can, as is discussed with reference to FIGS. 7 and 8, guide a user of ecological impact evaluator 164 to make more ecologically beneficial decisions with respect to water consumption in her respective locality. As another example, the UI 402 provides a recycling assistant 408, as is described with reference to FIGS. 9 and 10A-10B, that can be instrumental for assessing aspects of recycling, including material composition(s) of product packaging configurations that can warrant recycling according to corresponding recycling categories for those configurations. Still further, ecological impact evaluator 164 can execute a composting assistant 410 for, as is explained with regard to FIGS. 11 and 12, can aid a user in determining whether particular waste products can be compostable. In some implementations, the composting assistant 410 can provide a recommendation as to a specific type of composting that may be applicable to boost an ecological benefit for the user. In regard to one or more of the above implementations, the ecological impact evaluator 164 according to implementations of the present technology can calculate, by an ecological ("Eco") score calculator 412, an ecological impact of behaviors that the user has engaged in or is about to engage in. Additional descriptions of applicable calculations are provided in relation to FIGS. 13 and 14, as discussed below.

Figure 5:
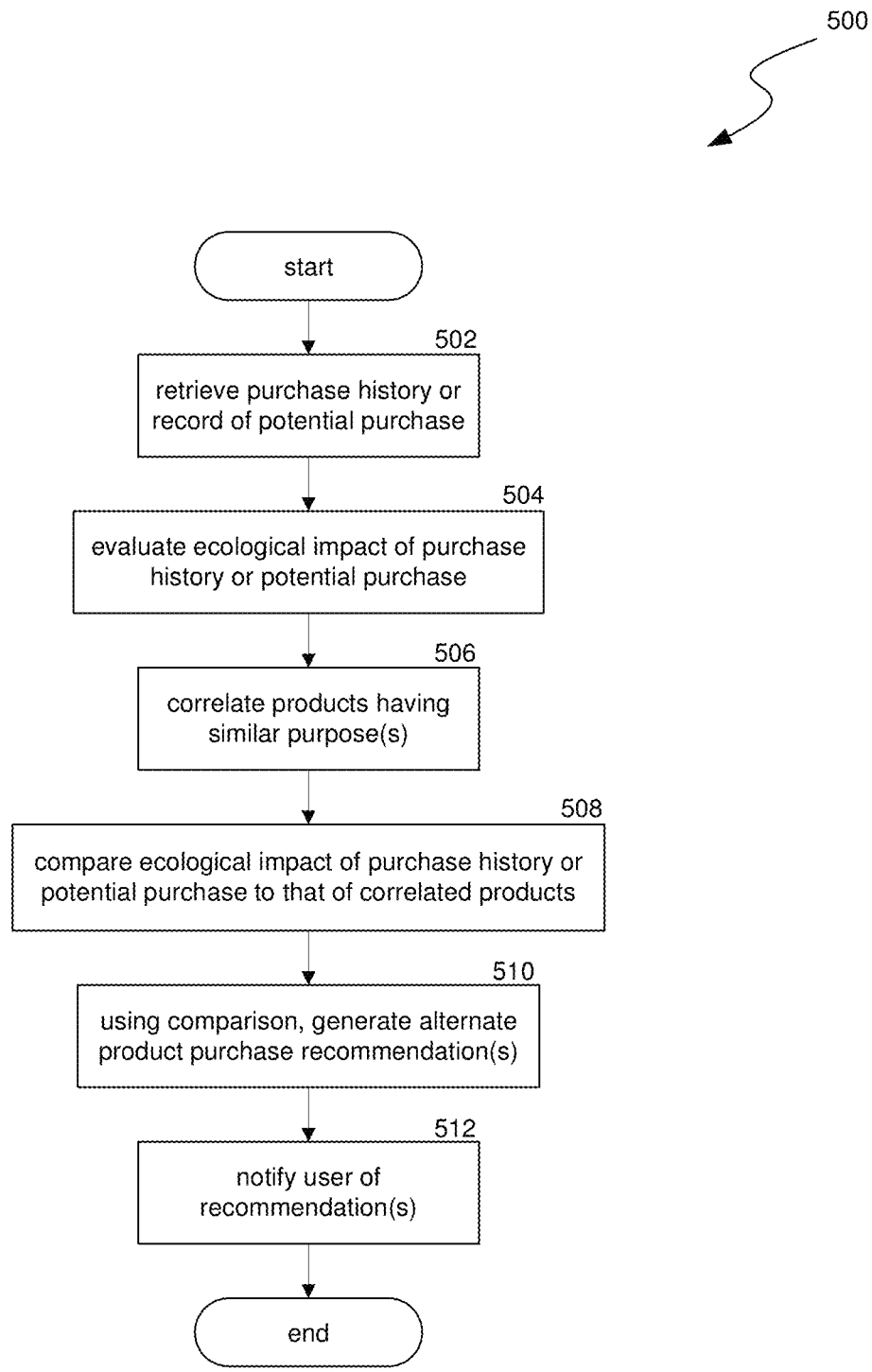
FIG. 5 is a flow diagram illustrating a process used in some implementations for generating one or more product purchasing recommendations for producing an ecological impact.

FIG. 5 is a flow diagram illustrating a process 500 used in some implementations for generating one or more product purchasing recommendations for producing an ecological impact. Process 500 can be initiated in response to a user desiring evaluation of an ecological impact for one or more past or prospective purchases. One or more portions of process 500 can be performed according to an application that can be executed on a server for ecological impact evaluator 164; alternatively, one or more portions of process 500 can be performed on a client device executing the application.

At block 502, process 500 can retrieve a purchase history or a record of a potential purchase of a user of ecological impact evaluator 164. For instance, the history or record can be for any of a myriad of consumer goods, such as everyday household products, energy sources (e.g., electricity, gasoline, natural gas), consumables such as paper products, batteries, food, etc. In some implementations, process 500 can retrieve the purchase history or record of a potential purchase as a result of a user permissioning ecological impact evaluator 164 to collect data sourced by the user's online activity, or by the user's implementation of a smart device (e.g., a cellphone) to image purchased products or those which are considered for purchase (e.g., in a shopping cart). In some implementations, such a smart device can be implemented by the user to track activities for daily routines involving product purchases. Such tracking can be directed to, for example, a user's driving practices, including distances traveled, type(s) of vehicle(s) used, gasoline consumption, acceleration patterns), or otherwise, i.e., whether a user is a consumer of public transportation, where the tracking can collect similar types of information. In still other implementations, process 500 can retrieve purchase information for products that can be derived from a consumption level for those products. As an example, process 500 can retrieve, via one or more smart device integrations for a user's home or business, an amount of energy usage for a given time period. In this regard, such an integration can involve the use, for instance, of a smart plug that can track energy usage of devices such as appliances, televisions, computers, etc. In other cases, the amount of energy usage can be tracked according to a degree of energy waste, such as by infrared sensing gauging efficiency for energy consumption.

At block 504, process 500 can evaluate an ecological impact of products purchased by the user or which are considered for purchase. That is, process 500 can, for instance, evaluate a carbon footprint for the purchase(s) or potential purchase(s). In doing so, process 500 can determine the carbon footprint by considering various aspects for a purchase. As examples, such aspects can include carbon emissions resulting from the manufacture, delivery, use, and disposal of products which are or could be the subject of a purchase.

At block 506, process 500 can correlate products which can be similar in purpose to products for a user's purchase history or potential purchase. In this regard, the similarity can be gauged in terms of, for example, a size, utility, longevity, and performance of a particular product for accomplishing one or more goals of a user.

At block 508, process 500 can compare an ecological impact for a user's purchase history or potential purchase to that of one or more of the correlated products. For instance, process 500 can determine whether a carbon footprint for the correlated product(s) is less than, the same as, or greater than a carbon footprint for the user's purchase(s). In these regards, for example, a lesser carbon footprint can be the result of a product being manufactured nearby a location of the user such that carbon emissions are decreased for delivery of that product. In another case, a carbon footprint for a product can be lesser in magnitude due to the product being packaged differently than products previously purchased by the user. It will be understood that these are just some of the ways that a product may exhibit a more advantageous ecological impact.

At block 510, process 500 can, using the comparison, generate alternate product purchase recommendations that the user can be provided in order to maintain or improve an ecological impact owing to purchasing habits or tendencies. As examples, one or more of the recommendations can be to purchase a product with greater potency (i.e., a concentrate) since it can be packaged to be smaller in size than previously purchased "regular strength" products, and thus be associated with a decreased amount of delivery carbon impact and lesser material that would need to be discarded for recycling. As another example, a recommendation can be to purchase a locally manufactured product since carbon emissions associated with delivery of that product to the user would be less than those associated with delivery of previously purchased products originating at a distant location. As yet another example, process 500 can recommend, in the context of energy purchase and consumption, devices and systems that can be more energy efficient when executing various tasks. In these ways, process 500 can provide the user with recommendations that can enable the user to make more informed decisions for product purchasing.

At block 512, process 500 can notify the user of one or more recommendations generated at block 510. For instance, one or more corresponding notifications can be in the form of a text message, an email, an automated telephone call, a mobile device push notification, a pop-up message on the user's internet browser, etc.

Figure 6:
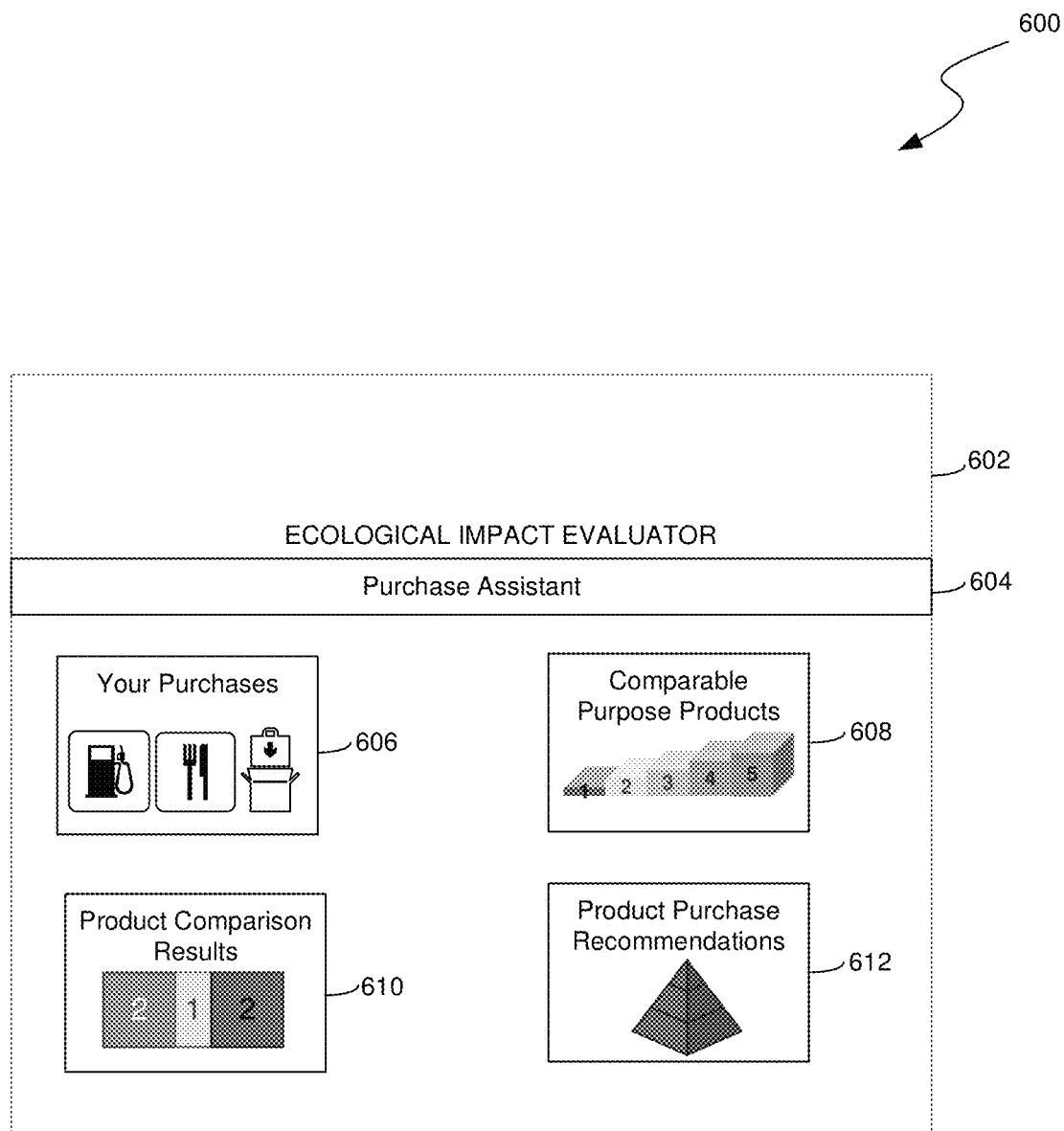
FIG. 6 is a conceptual diagram illustrating, according to implementations of the present technology, a UI purchase assistant element according to an ecological impact evaluator executing the process of FIG. 5.

FIG. 6 is a conceptual diagram 600 illustrating, according to implementations of the present technology, a UI purchase assistant element according to an ecological impact evaluator 602 executing process 500 of FIG. 5, where the evaluator can be a same evaluator, i.e., ecological impact evaluator 164, for respective assistants as are discussed with reference to FIGS. 8, 10A, 12, and 14. More specifically, the purchase assistant 604 can, for process 500 of FIG. 5, present a user with various menu items such as "Your Purchases" 606, "Comparable Purpose Products" 608, "Product Comparison Results" 610, and "Product Purchase Recommendations" 612. In these ways, the purchase assistant 604 can provide the user a summary review of her purchase history and contemplated purchases for exemplary products such as energy sources, food, and packaging. Based on that review, the purchase assistant 604 can execute block 506 to compile products that can correlate to a same or similar purpose evidenced for the user's prior or intended purchases. The assistant 604 can determine one or more correlations according to, for example, a mapping of products to purposes. For instance, in a case in which a prior purchase entailed a one gallon container of laundry detergent, a comparable purpose product can be a one quart size container of concentrate of that same detergent. Using correlations such as this, purchase assistant 604 can execute block 508 of FIG. 5 to run a product comparison for previously purchased or contemplated purchases versus the one or more correlated products. In doing so, purchase assistant 604 can evaluate, for instance, corresponding carbon footprints. In view of the comparison(s), a user can then be presented with product purchase recommendations in response to the purchase assistant 604 executing block 510 of FIG. 5, where the recommendations can be for correlated products having a same or lesser carbon footprint relative to the user's purchase history and prospective purchase(s). Thus, as can be understood, the purchase assistant 604 can aggregate the above types of information to better inform the user of ecological impact evaluator 164 as to options for avoiding increasing her ecological impact.

Figure 7:
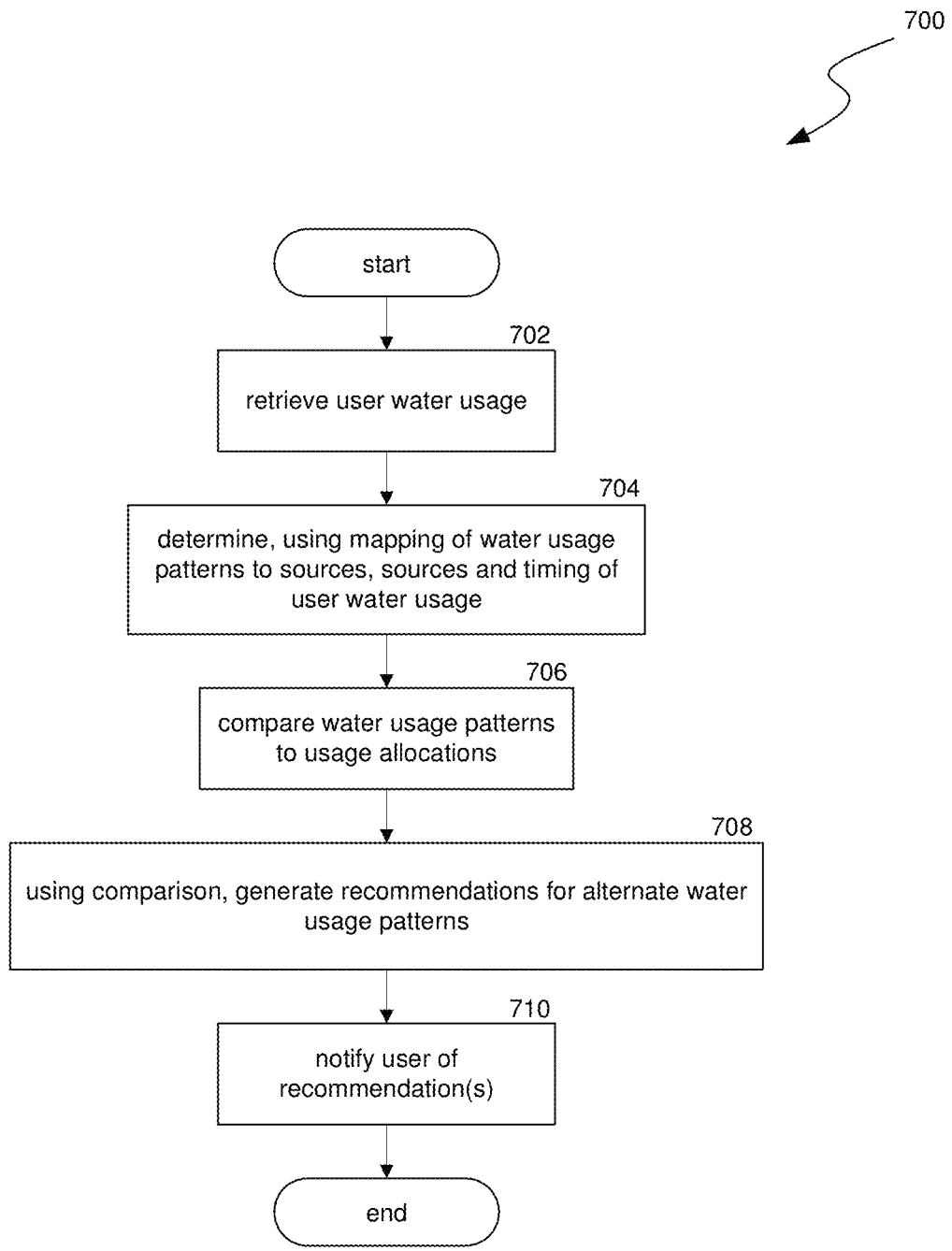
FIG. 7 is a flow diagram illustrating a process used in some implementations for generating one or more water usage recommendations for producing an ecological impact.

FIG. 7 is a flow diagram illustrating a process 700 used in some implementations for generating one or more water usage recommendations for producing an ecological impact. Process 700 can be initiated in response to a user enabling monitoring for the user's water usage, where the monitoring can be associated with, for example, one or more water consumption devices (e.g., appliances) or water supply systems, such as showering or irrigation systems. One or more portions of process 700 can be performed according to an application that can be executed on a server for ecological impact evaluator 164; while, in some cases, one or more portions of process 700 can be performed on a client device that can be in communication with the water consumption devices or water supply systems.

At block 702, process 700 can retrieve a user's water usage, including, for example, amounts, usage times, patterns of usage, etc. For instance, such details for that usage can be wirelessly transmitted to ecological impact evaluator 164 from an water meter or imaging device installed with relevant water metering instruments for the user's home or business. In this regard, it is contemplated that such an imaging device can timestamp cycling for meter readings so that amounts of water usage for relevant cycles can be indicative of corresponding water usage patterns.

At block 704, process 700 can determine, using a mapping of water usage patterns to water sources, sources and timing of water usage for the user. Such a mapping can identify water usage sources according to, for example, rates of water consumption (e.g., gallons per increment of time) associated with devices (e.g., irrigation systems, appliances, personal hygiene devices). This way, process 700 can identify when and in what capacities a user consumes water at any given time.

At block 706, process 700 can compare the user's water usage patterns to allocations for water usage. The allocations can be model allocations that can specify, for instance, incremental (i.e., daily, weekly, monthly) amounts of water that a user ought to consume for one or more particular activities as a result of using a particular device. For example, the allocations can specify that showering for a user ought to consume 100 gallons per week, that irrigating a lawn ought to consume about 12,000 gallons per month, etc.

At block 708, process 700 can, using the comparison(s) provided at block 706, generate recommendations that can result in alternate water usage patterns. Such alternate patterns can specify, for instance, different sources, timing and distribution products for water usage that can result in a decreased ecological impact. In particular, an example recommendation may be to collect and use gray water (i.e., water that is domestic wastewater ordinarily sourced from sinks, showers, washing machines and dishwashers). Another example recommendation can be to operate one or more appliances or irrigation systems according to weather patterns and an available gray water supply. In this case, scheduling aspects for the operation of these appliances or systems can be determined by equipping those appliances or systems with a smart device (e.g., an actuator that can receive weather data) that can coordinate their respective on and off cycles and operating intervals. Yet another example recommendation can be to, for example, implement a water budget that can avoid surpassing one or more allocations for water usage. Such a water budget can spread out an overall water usage amount of a user, so as to maintain a targeted water usage (e.g., decreasing a run time of a dishwasher to allow for increased irrigation). Process 700 can generate these and other water usage recommendations with the goal of maintaining or reducing water usage to thus reduce a carbon footprint that can be associated with required water treatment operations.

At block 710, process 700 can notify a user of the recommendations generated at block 708 by way of similar notifications as have been discussed with reference to block 512 of FIG. 5.

Figure 8:
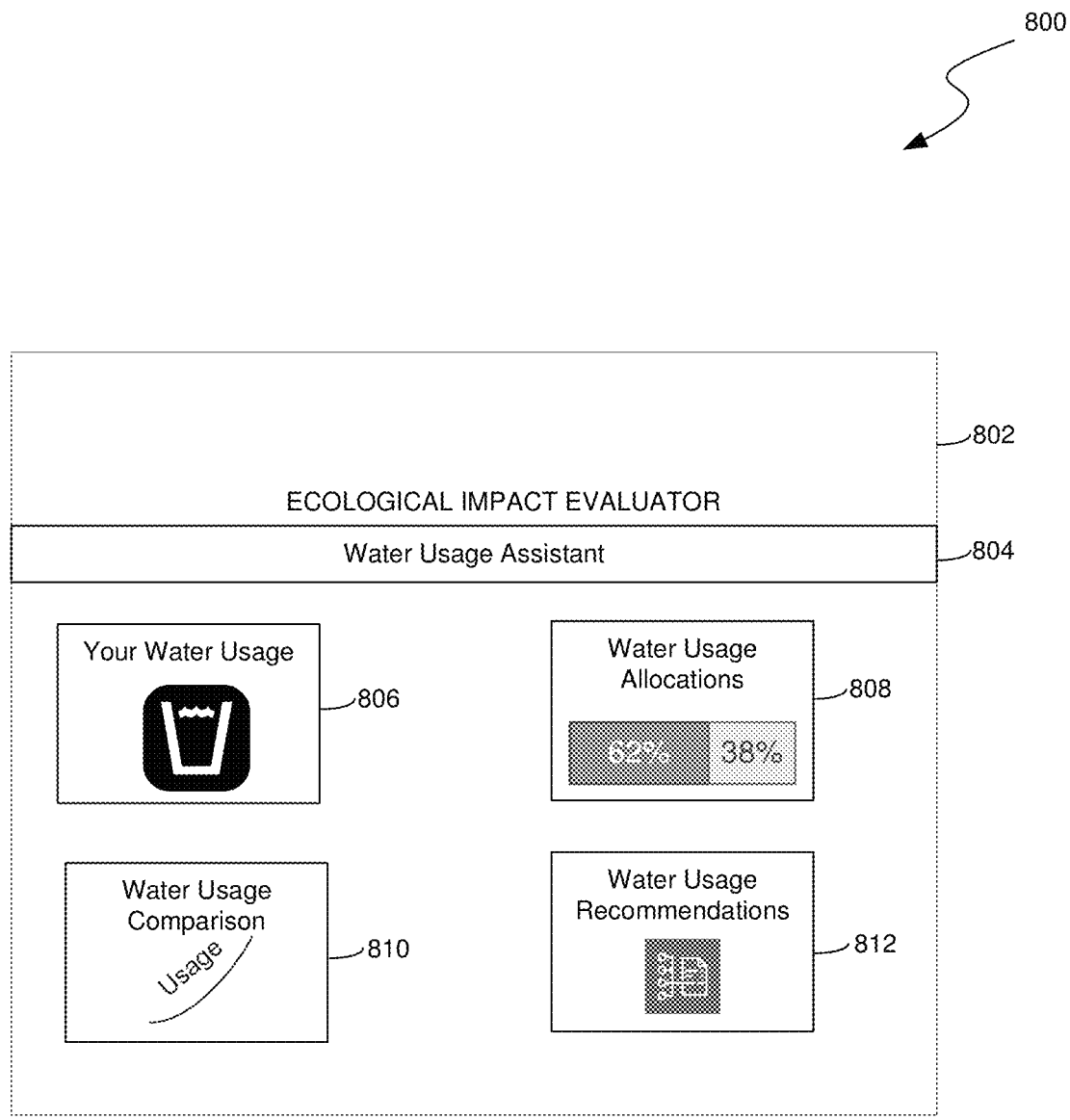
FIG. 8 is a conceptual diagram illustrating, according to implementations of the present technology, a UI water usage assistant element according to an ecological impact evaluator executing the process of FIG. 7.

FIG. 8 is a conceptual diagram 800 illustrating, according to implementations of the present technology, a UI water usage assistant element according to an ecological impact evaluator 802 executing process 700 of FIG. 7. In particular, water usage assistant 804 can, for steps corresponding to process 700 of FIG. 7, present a user various selections including, "Your Water Usage" 806, "Water Usage Allocations" 808, "Water Usage Comparison" 810, and "Water Usage Recommendations" 812. In accordance with process 700, assistant 804 can, for reflected water usage and specified allocations, execute block 706 of FIG. 7 to determine whether a user is compliant with or exceeding amounts of water allocated, for example, with respect to usage times, devices, etc. As a result of the determinations, a user can access, at 812, one or more recommendations, of the types discussed above, to enable the user to more efficiently regulate water consumption. This way, the user can choose to adopt and implement such recommendations when endeavoring to maintain or reduce an ecological impact of the user's water consumption.

Figure 9:
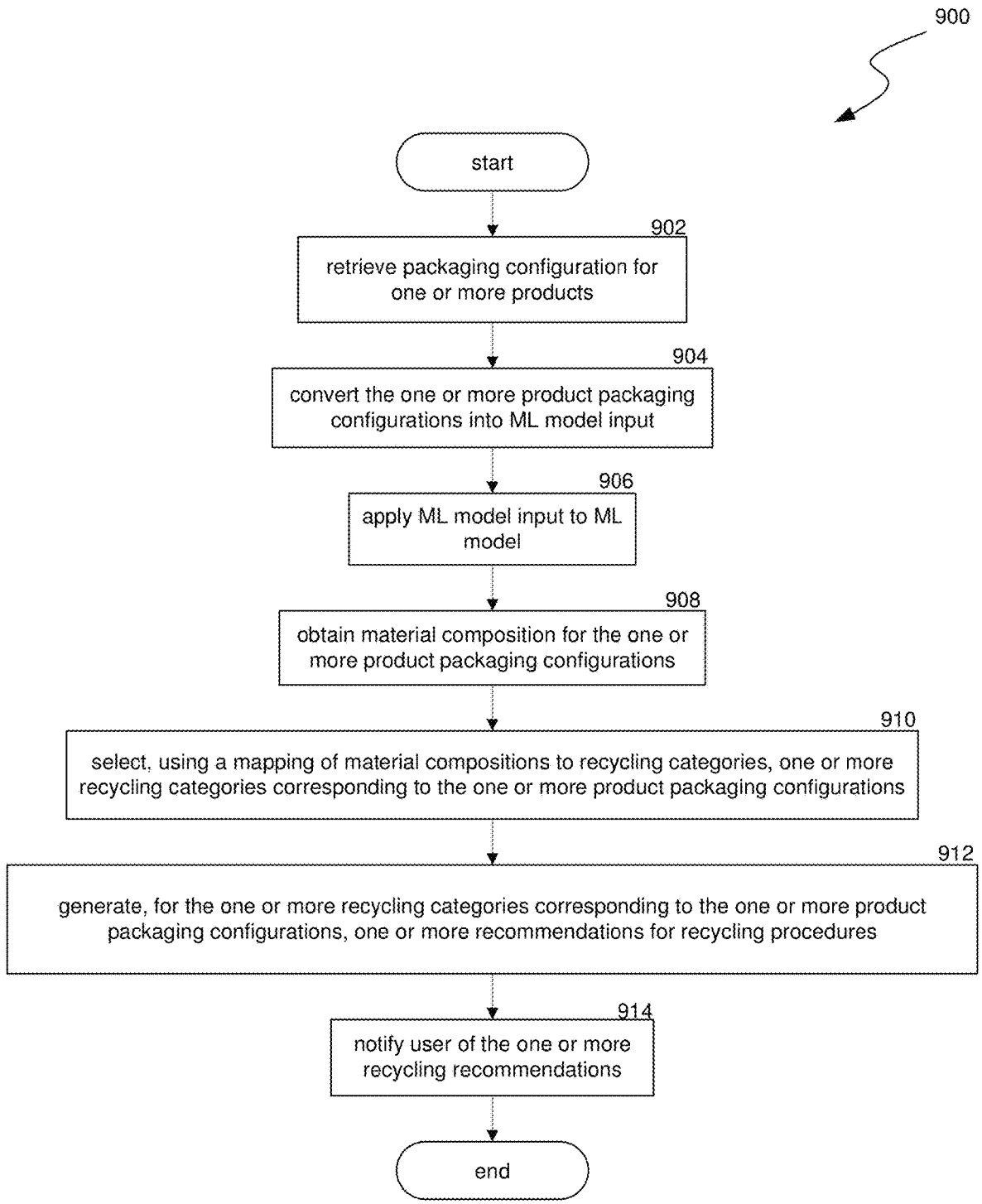
FIG. 9 is a flow diagram illustrating a process used in some implementations for providing one or more recycling recommendations to effect an ecological impact.

FIG. 9 is a flow diagram illustrating a process 900 used in some implementations for providing one or more recycling recommendations to effect an ecological impact. Process 900 can be initiated as a result of a user needing to recycle one or more product packaging configurations, wanting to know how to best recycle those configurations, and activating process 900 e.g., by holding the item up to a cmara or activating control 1010 discussed below. One or more portions of process 900 can be performed according to an application that can be executed on a smart device for identifying material compositions for configurations; and in some cases, one or more portions of process 900 can be executed by a server in communication with the smart device—e.g., for providing a mapping of material compositions that can be applicable for recycling categories.

At block 902, process 900 can retrieve a packaging configuration respectively corresponding to one or more products that have been purchased and/or used by a user of ecological impact evaluator 164. Herein, the terms "product packaging configuration," "packaging configuration," and "configuration of packaging" can refer to a product itself, as defined by one or more of an outline, weight, size, or thickness of the product, and/or one or more containers, overlays, abutments, or shielding for the product. The configurations can connote a size and/or volume of a product that define a substance of a product, a fragility of a product, etc. The one or more configurations, that can provide connotations for corresponding products, can be captured in real-time by an electronic device enabled to image a product packaging configuration for a current or prospective purchase. Alternatively or in addition, one or more of the product packaging configurations received at block 902 can correspond to a record for one or more previously recognized purchases of a user. For instance, the record can be in a storage for one or more images captured by, for example, the user's cellphone as purchases are made. In another instance, the record can correspond to one or more images for product packaging configurations obtained by, or transferred to, an electronic device for process 900.

At block 904, process 900 can convert the one or more packaging configurations into machine learning model input. For example, images for the packaging configurations can be converted into a histogram or other numerical data that the machine learning model has been trained to receive.

At block 906, process 900 can apply the machine learning model input to a machine learning model. A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

The machine learning model can be trained with supervised learning and use training data that can be obtained from products and their corresponding packaging configurations. More specifically, each item of the training data can include an instance of a packaging configuration matched to a corresponding material composition. The matching can be performed according to known relationships for material compositions ability to form one or more respective products or packaging configurations. During the model training a representation of the packing configurations (e.g., histograms of the images, values representing the configurations, etc.) can be provided to the model. Then, the output from the model, a material composition for packaging configuration, can be compared to the actual material composition(s) and, based on the comparison, the model can be modified, such as by changing weights between nodes of the neural network or parameters of the functions used at each node in the neural network (e.g., applying a loss function). After applying each of the pairings of the inputs (product packaging configurations) and the desired output (corresponding material compositions) in the training data and modifying the model in this manner, the model is trained to evaluate new instances of product packaging configurations in order to determine one or more material compositions for those configurations.

At block 908, process 900 can obtain one or more material compositions, for the one or more product packaging configurations retrieved at block 902, based on the model output from block 906. In this regard, the one or more material compositions can be a specific one of materials (i.e., plastic, glass, paper, metal), while in some cases one or several material compositions can be a composite of included materials, i.e., where no one material is dominant (e.g., electronics). In some implementations, process 900 can obtain the one or more material compositions by using, at least in part, the record of previously purchased products that can be retrieved at block 902. That is, the material compositions can correspond to newly purchased products (i.e., products for which corresponding configurations are of a first impression to process 900) as well as previously purchased ones (i.e., products for which process 900 has, on another occasion, determined a material composition and provided a recycling recommendation). In this way, an accuracy for determining a material composition of one or more of the product packaging configurations received at block 902 can be increased in view of a same configuration being recognized as corresponding to both a newly and previously purchased product. As an example, a previously determined material composition of aluminum corresponding to a previous purchase for cans of carbonated beverages can serve as a baseline by which to judge the material composition for new product packaging configurations having a similar (i.e., can-like) appearance.

At block 910, process 900 can select one or more recycling categories which can be applicable for product packaging configurations retrieved at block 902. In making the selection(s), process 900 can use a mapping of material compositions to recycling categories, where the categories (e.g., paper, plastic, metal, glass, electronics) can be defined according to a majority material composition. For instance, if a configuration of packaging comprises 80% paper and 20% plastic, then the applicable recycling category can be paper.

At block 912, process 900 can generate one or more recommendations for recycling procedures that can be applicable for packaging configurations retrieved at block 902. The recommendations can directly correlate to recycling categories for the configurations. For example, if a majority material composition of a configuration is plastic, glass, metal, etc., the applicable recommendation can be to discard the corresponding product packaging by placing it in a receptable designated for the particular material composition. In some implementations, process 900 can generate one or more recommendations for prospectively purchasing a product according to a material composition for a product packaging configuration for which a recycling recommendation has already been provided. For instance, such a purchasing recommendation can be for a product as a result of its product packaging recommendation having a material composition that is more easily recyclable (e.g., paper) than is another composition (e.g., plastic). In this regard, such a purchasing recommendation can be to repurchase a same product in view of its ease of recyclability.

At block 914, process 900 can notify the user of ecological impact evaluator 164 of the one or more recycling recommendations generated at block 912. In this regard, process 900 can provide notifications for the recommendations, where the notifications can be a display of the recommendation on an electronic device for process 900 (e.g., device 1052 in FIG. 10B). Alternatively or in addition, the notifications can be in the form of lighting, on a given recycling receptacle, that can be illuminated, as discussed below with reference to FIG. 10B, to provide a visual cue to the user that the receptacle is an appropriate repository for a product packaging configuration. In another case, a notification can be an audible message to notify a user of an appropriate receptacle for a product packaging configuration. In still other cases, process 900 can notify a user of an appropriate recycling receptacle via a notification combining the aforementioned display, lighting and/or audible cues. In these ways, process 900 can provide step-by-step guidance to a user that desires to improve her ecological impact by recycling unwanted materials.

Figure 10A:
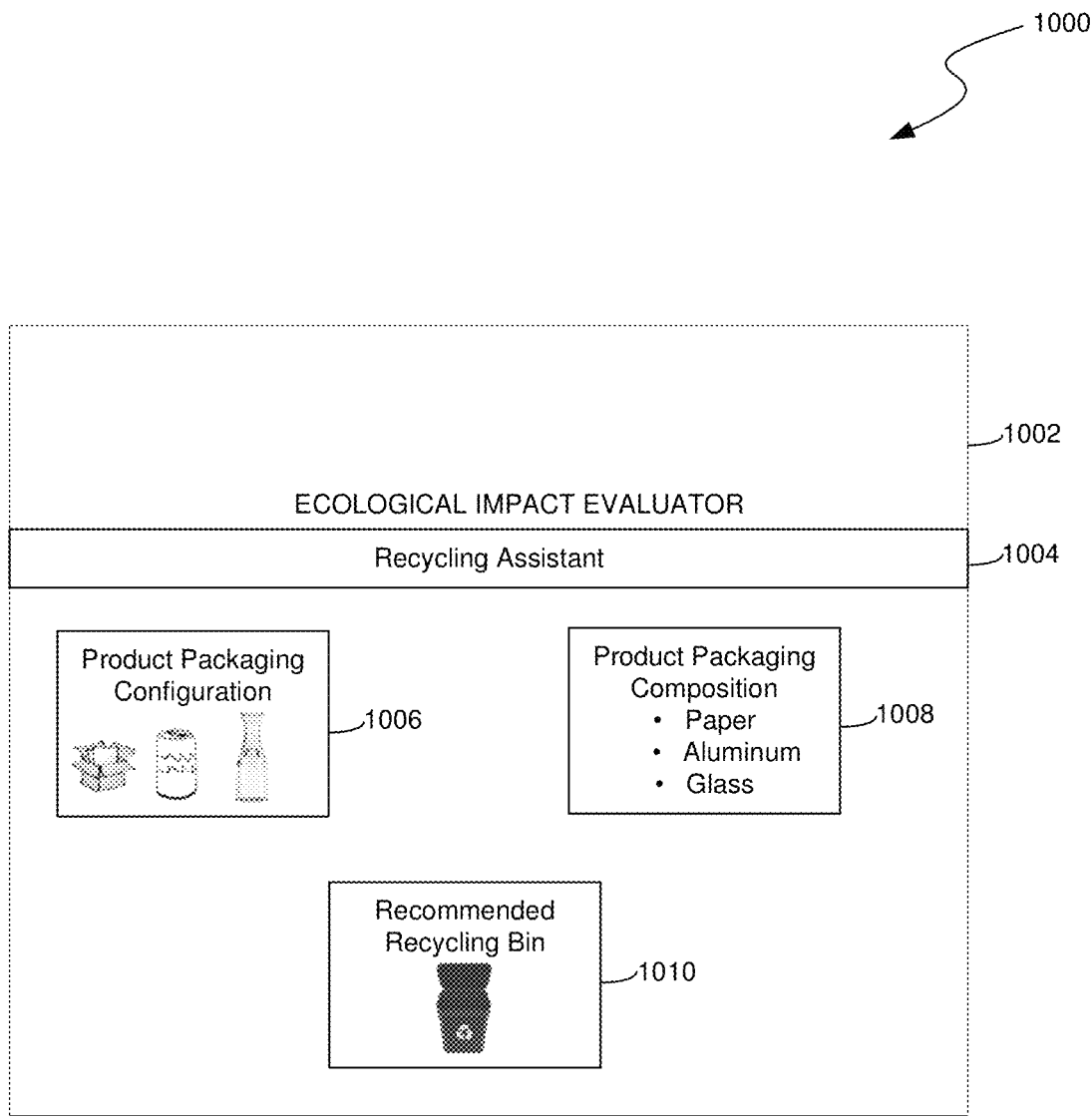
FIG. 10A is a conceptual diagram illustrating, according to implementations of the present technology, a UI recycling assistant element according to an ecological impact evaluator executing the process of FIG. 9.
Figure 10B:
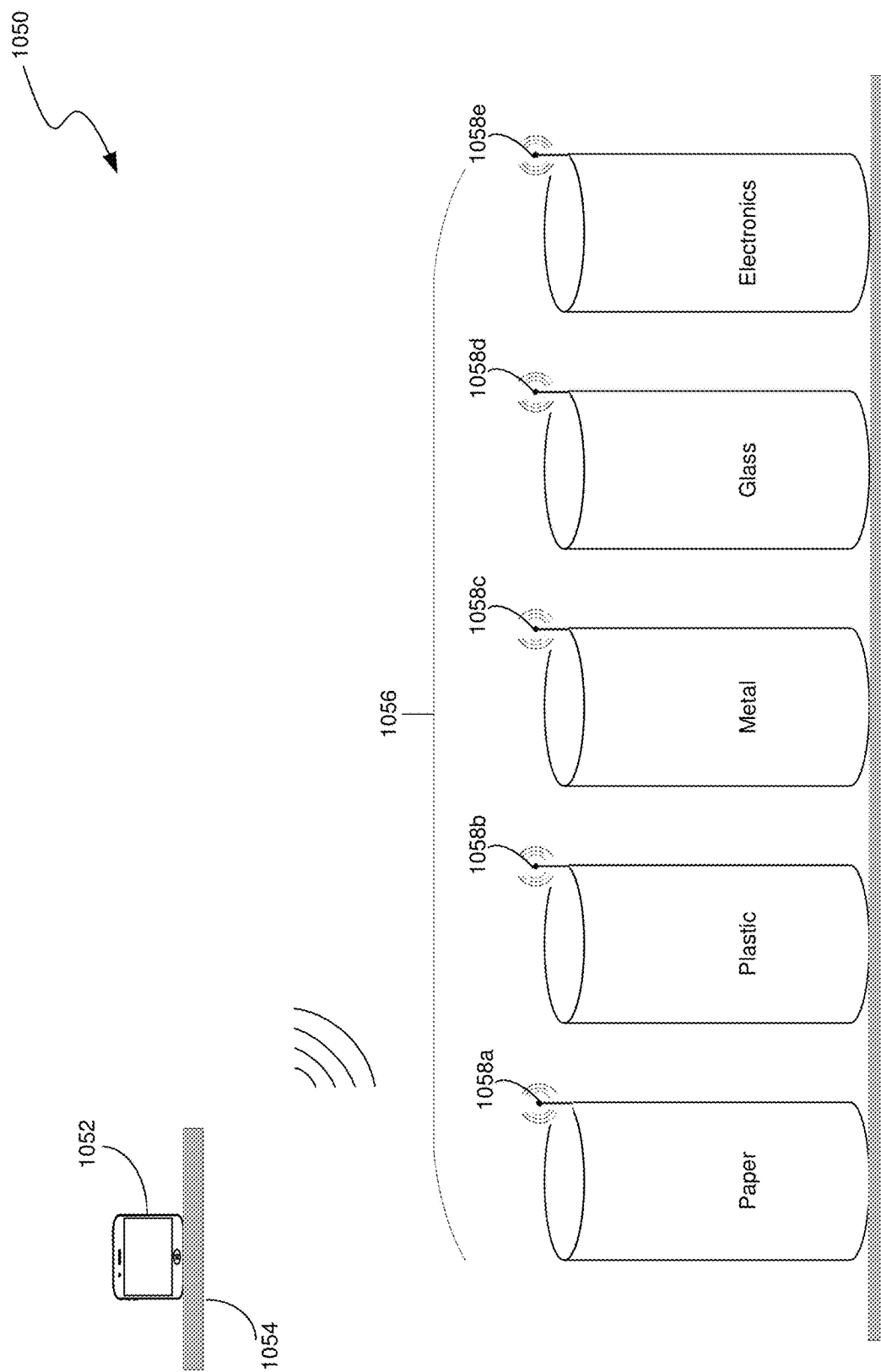
FIG. 10B is a conceptual diagram illustrating, according to implementations of the present technology, a recycling infrastructure that can implement differentiation for recycling options which may be applicable for one or more products that can be recycled.

FIG. 10A is a conceptual diagram 1000 illustrating, according to implementations of the present technology, a UI recycling assistant element according to an ecological impact evaluator 1002 executing process 900 of FIG. 9. Specifically, recycling assistant 1004 can, for products which a user desires to recycle, execute process 900 to display presented product packaging configurations 1006, their corresponding compositions 1008, and one or more recommendations 1010 for an appropriate recycling bin. FIG. 10B is a conceptual diagram 1050 illustrating, according to implementations of the present technology, a recycling infrastructure that can implement differentiation for recycling options which may be applicable for one or more products that can be recycled. That infrastructure can include a smart device 1052 including processing, memory, and imaging capabilities for executing the recycling assistant 1004 through wireless communication with a plurality of recycling bins 1056, each of which is designated for a particular type of recycling according to a material composition (e.g., paper, plastic, metal, glass, electronics) of a product packaging. The smart device 1052 can be mounted on a ledge 1054 extending from a wall (not shown) in a vicinity of the bins 1056 so as to be easily accessible to a user.

In operation, a user can present a product packaging configuration 1006 to the device 1052, thus causing the recycling assistant 1004 to image and display that configuration and determine, according to block 908 of FIG. 9, its corresponding material composition. Using the determined composition, the assistant 1004 can select, according to block 910 of FIG. 9, the appropriate recycling category (paper, glass, etc.) and alert the user of the corresponding recycling bin 1056 into which the product packaging configuration ought to be discarded. Each of the bins 1056 can include a description (paper, glass, etc.) corresponding to a recycling category, where the description can be illuminable signage (e.g., 1058a-1058e) integrated with the bin and in communication with the device 1052, via an antenna 1058, for indicating the selected bin 1056. For instance, signage on the selected bin can be illuminated according to a color coding for the appropriate recycling category. This way, the user of assistant 1004 can be visibly alerted as to which recycling bin 1056 is appropriate (i.e., recommended) for the presented product packaging configuration. As mentioned above, assistant 1004 can, alternatively or in addition, alert the user of the recycling recommendation via an audible alert. For instance, such an alert can, via an included speaker of the device 1052, be an announced description for the selected bin 1056, which in some cases, can be conveyed in connection with illumination of signage or light 1058 on the bin 1056. As such, the user can be appropriately guided to the correct recycling bin when desiring to recycle the presented product packaging configuration.

Figure 11:
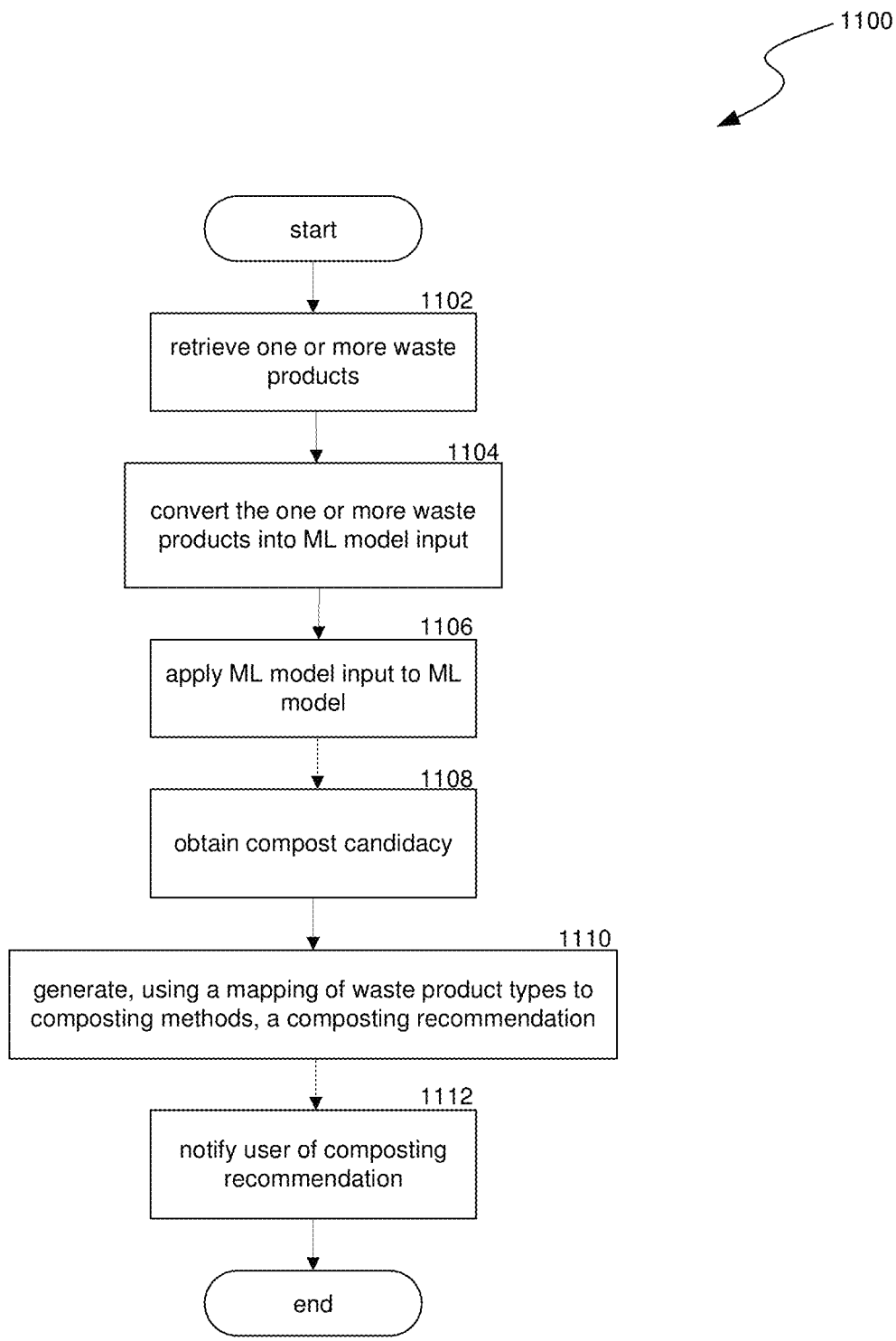
FIG. 11 is a flow diagram illustrating a process used in some implementations for generating one or more composting recommendations for producing an ecological impact.

FIG. 11 is a flow diagram illustrating a process 1100 used in some implementations for generating one or more composting (i.e., recycling of organic matter) recommendations for producing an ecological impact. In this regard, it is contemplated that device 1052 of FIG. 10B can be implemented to execute process 1100 as discussed below. Process 1100 can be initiated in response to a user desiring to know whether one or more products and/or product packaging configurations can qualify as waste that can be composted. One or more portions of process 1100 can be performed according to a smart device, such as smart device 1052 in FIG. 10B; while, in some cases, one or more portions of process 1100 can be performed on a server that that can support identifying types of products and/or product packaging configurations that the smart device 1052 has acquired (i.e., imaged).

At block 1102, process 1100 can retrieve one or more waste product types for waste products of a user of ecological impact evaluator 164. For example, the user can present the one or more products to the device 1052, which can then image and record them. In these regards, exemplary waste product types can be organic matter and include fruits and vegetables, eggshells, coffee grinds, yard and grass clippings, etc., where the waste product types can correspond to product packaging configurations for the respective waste products.

At block 1104, process 1100 can convert the waste products into machine learning model input. Similarly as in process 900 of FIG. 9, images for the waste products can be converted into a histogram or other numerical data that the machine learning model has been trained to receive.

At block 1106, process 100 can apply the machine learning model input to a machine learning model. Here, the machine learning model can be trained according to training data including images for waste products that qualify as compostable waste. More specifically, each item of the training data can include an instance of a waste product matched to a determination of compostability. The matching can be performed according to compostability determinations for prior categorizations (i.e., material compositions) of waste products. During the model training a representation of the waste products (e.g., histograms of the images, values representing the configurations, etc.) can be provided to the model. Then, the output from the model, a compost candidacy, can be compared to the actual compostability for a waste product and, based on the comparison, the model can be modified, such as by changing weights between nodes of the neural network or parameters of the functions used at each node in the neural network (e.g., applying a loss function). After applying each of the pairings of the inputs (waste product) and the desired output (a compost candidacy) in the training data and modifying the model in this manner, the model is trained to evaluate new instances of waste products in order to determine whether such products are eligible for composting.

At block 1108, process 1100 can obtain a compost candidacy for a waste product. That is, process 1100 can determine whether the waste product, according to its material composition, is degradable by one or more composting methods, such as aerobic composting, anaerobic composting, or vermicomposting.

At block 1110, process 1100 can, using a mapping of waste product types to composting methods (e.g., categories), generate one or more composting recommendations. In this regard, the mapping can specify, for a composting method, a material composition of desirable waste products for that method, where that composition can define whether the waste product is, for example, dry, oily, or acidic, etc. Process 1100 can thus, for the one or more waste products retrieved at block 1102, generate corresponding composting recommendations that suggest a most preferable composting method that a user of ecological impact evaluator 164 can pursue to lessen her carbon footprint (i.e., a total amount of all greenhouse gases). For instance, if a recommendation includes options to pursue alternative options of anaerobic composting and vermicomposting, the user can opt to pursue vermicomposting since anaerobic composting can lead to a release in the greenhouse gas methane ($CH_4$).

At block 1112, process 1100 can notify the user of the one or more composting recommendations generated at block 1110. Here, for example, the notifications can be in the form of an audible or textual alert provided by device 1052, a light or illumination from a compost bin or area, a notification on the user's mobile device, etc.

Figure 12:
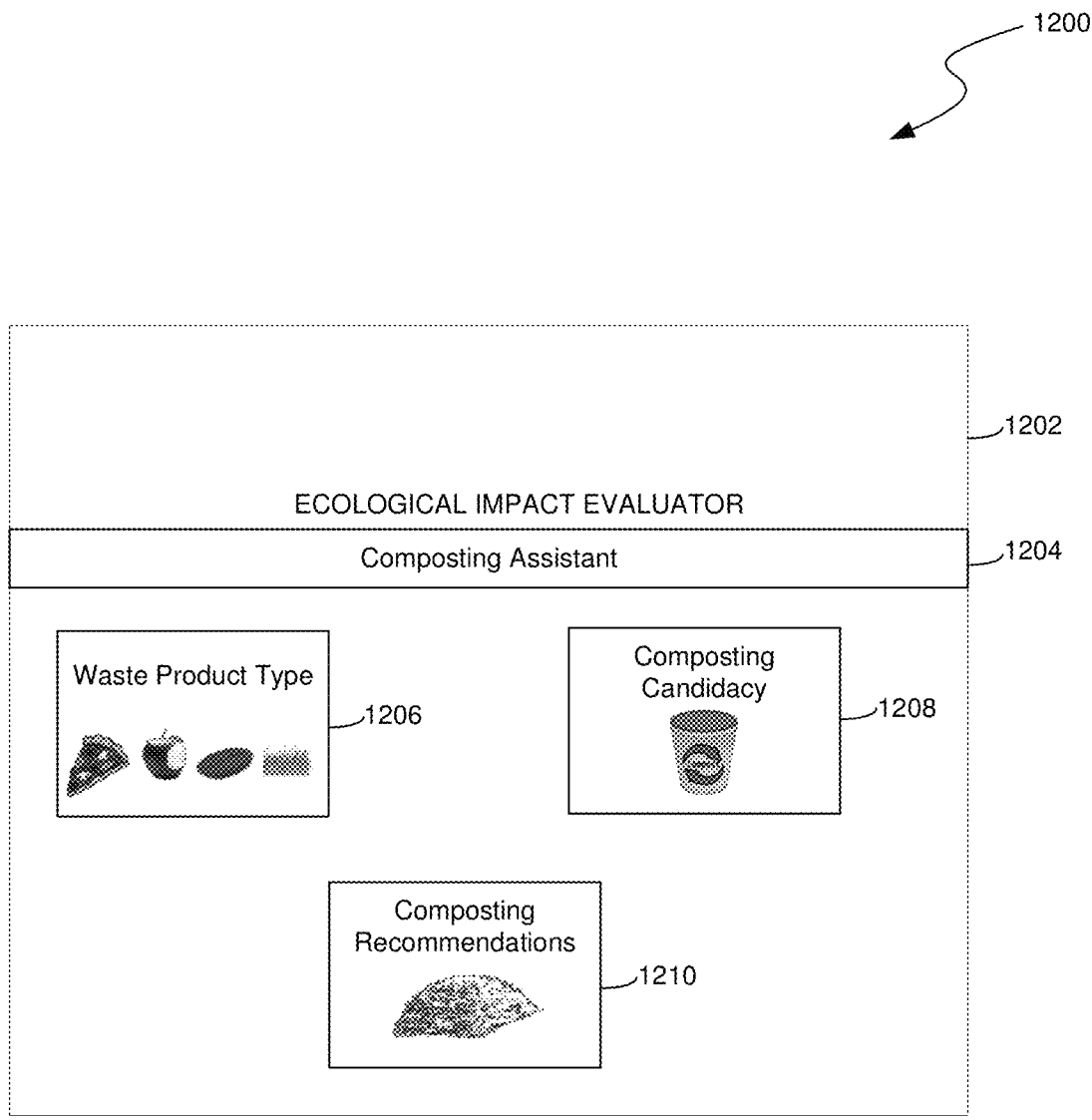
FIG. 12 is a conceptual diagram illustrating, according to implementations of the present technology, a UI composting assistant element according to an ecological impact evaluator executing the process of FIG. 11.

FIG. 12 is a conceptual diagram 1200 illustrating, according to implementations of the present technology, a UI recycling assistant element according to an ecological impact evaluator 1202 executing process 1100 of FIG. 11. More particularly, composting assistant 1204 can, in response to one or more waste product types being imaged by device 1052, provide corresponding display thereof on that device. In executing process 1100, composting assistant 1204 can determine, according to a material composition of the one or more waste products, respective composting candidacies and indicate the same in the affirmative or negative on the display of device 1053. Using outcomes for the candidacies (i.e., yes or no results for compostability), composting assistant 1204 can, as mentioned, display or announce applicable composting methods that can be options for discarding waste products that can be compostable.

Figure 13:
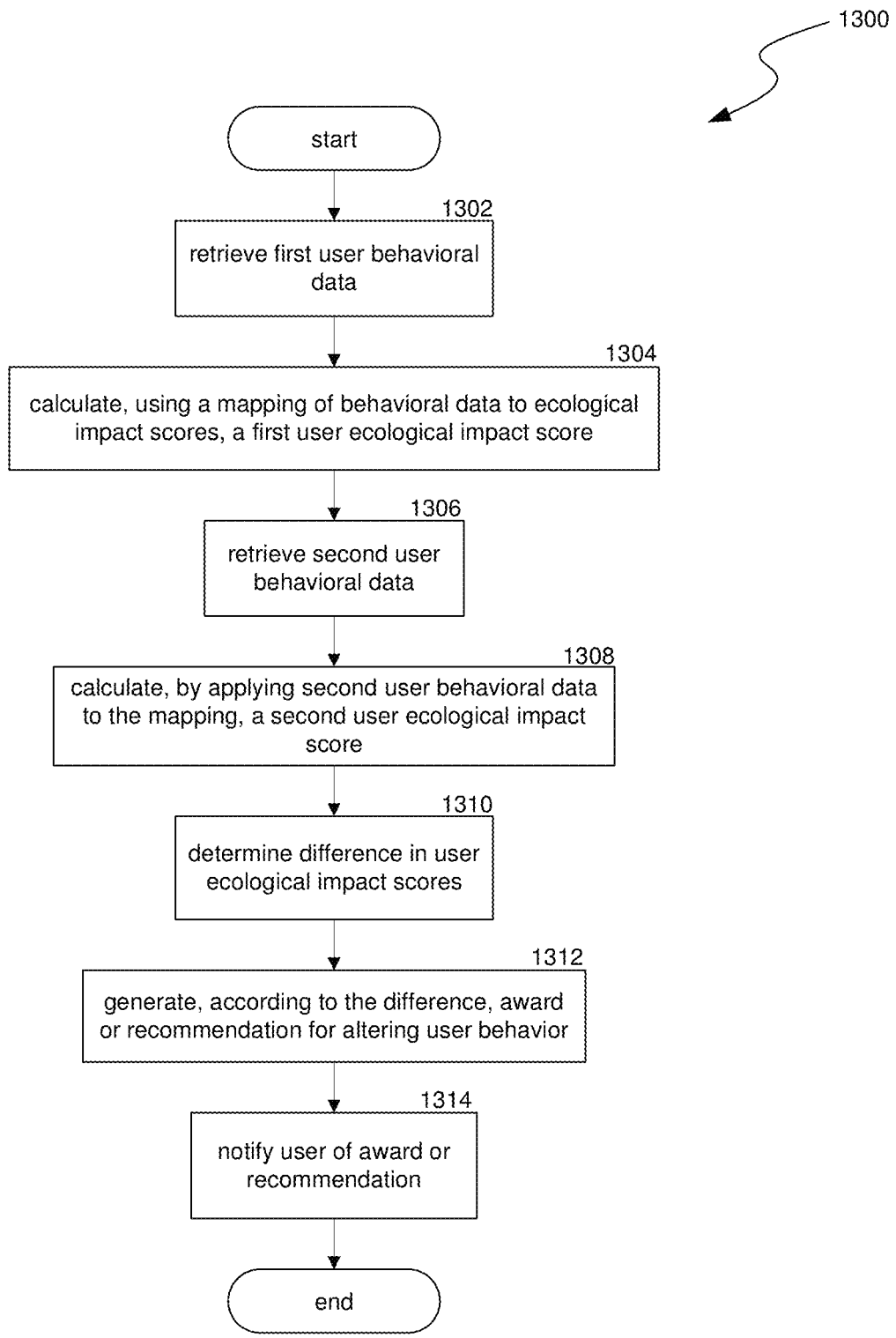
FIG. 13 is a flow diagram illustrating a process used in some implementations for generating an ecological impact score according to one or more behaviors that can be assessed for that score.

FIG. 13 is a flow diagram illustrating a process 1300 used in some implementations for generating an ecological impact score according to one or more behaviors that can be assessed for that score. Process 1300 can be initiated as part of an automatic tracking of user behavior that can have an ecological impact, such as purchasing, obtaining (e.g., via delivery or pick-up), using, and recycling one or more products and/or product packaging configurations. One or more portions of process 1300 can be performed according to an application that can be executed on a server for ecological impact evaluator 164; alternatively, one or more portions of process 1300 can be performed on a client device executing the application—e.g., a client device that can image a product which is the target of a prospective purchase, and then evaluate ecological aspects for that product.

At block 1302, process 1300 can retrieve first behavioral data corresponding to activities of a user, where the activities can be measurable for determining an associated ecological impact. More particularly, process 1300 can automatically retrieve such data as a result of one or more types of monitoring (e.g., via one or more of authorizations for access to online activity for monitoring of product purchasing, one or more smart device integrations with the user's home or business for monitoring of the user's product consumption, water or energy usage, etc., authorization to access a smart device associated with recycling or composting for a user, a user's wearable or included sensors of the user's vehicle(s) for monitoring driving practices) that a user of ecological impact evaluator 164 has permissioned. In some implementations, a monitoring can be of an online purchase activity of a user, or of a spontaneous purchase activity as captured by a device enabled to record (i.e., image) physical selections for purchases as they occur. For instance, such a device can be a cellphone mounted to a shopping cart, where the cellphone is configured to image a selection for purchase prior to it being placed into the cart. In some implementations, a monitoring can be of one or more of user's driving activity (acceleration rate, distance traveled, gallons of gasoline used, etc.), and an energy expenditure or consumption in the user's home or business. In some implementations, a monitoring can be for a number of times a user has imaged one or more products or product packaging configurations for recycling or composting the same. Here, the image(s) can be counted by a counter defined as part of a smart device (e.g., device 1052 of FIG. 10B) for implementing those procedures according the present technology as discussed herein.

At block 1304, process 1300 can calculate, using a mapping of behavioral data to ecological impact scores, a first user ecological impact score. In this regard, the mapping can specify, for instance, particular types of behavior which can be retrieved (i.e., monitored) at block 1302. Each of the types of behavior can be assigned an ecological impact value that can reflect a magnitude of contribution to a user's carbon footprint. That is, an ecological impact score for a user's behavior(s) that is small in magnitude can indicate minimization for that user's carbon footprint, and vice versa. For instance, a user's selection and use of a smaller, less-gasoline consuming vehicle can have a smaller ecological impact value than would a selection for and use of a larger, more gasoline dependent vehicle. As another example, a user's purchase of smaller container of concentrated laundry detergent can be a behavior of the user that contributes less to the user's carbon footprint than would a larger container of that same detergent if it were purchased. This can be the case since carbon emissions related to manufacturing and recycling (or other form of disposal) for the smaller container can be measurably less. It will be understood that these are just some of the behaviors that can be assessed for scoring according to the above mapping.

At block 1306, process 1300 can, similarly as in the case of the first behavioral data, automatically retrieve second behavioral data for a user. That is, the scoring for first behavioral data retrieved at block 1302 can serve as a baseline against which the second behavioral data, for the user's ongoing efforts with respect to ecological impact, can be evaluated. In some implementations, the first and second behavioral data can be a same type of behavioral data. In other implementations, these types of data can be different. In other words, the first behavioral data can, for example, include solely a purchase history for the user, while the second behavioral data can include solely a monitoring for the user's driving practices.

At block 1308, process 1300 can calculate, by applying the second user behavioral data to the mapping used at block 1304, a second ecological impact score for the user.

At block 1310, process 1300 can determine a difference in the user's first and second ecological impact scores. The difference can suggest an increasing or decreasing effort by the user to lessen her ecological impact (i.e., carbon footprint). As can be appreciated from the above, the first and second scores can include scoring for different types (i.e., categories) of behavior of the user. In any case, however, scoring for these categories can be combined to reach the difference amount. This can be important since the user can face various lifestyle constraints that can limit her ability to improve efforts for lowering her ecological impact. An example can be illustrated by a situation in which the user is unable to operate anything other than the larger vehicle which she currently owns, but makes every attempt to purchase recyclable paper products, instead of those involving large amounts of plastics.

At block 1312, process 1300 can generate, according to the difference in scoring, an award for lowered ecological impact achieved by the user. Types of exemplary awards can include discounts for purchases of low ecological impact products and services, discounts for purchases of devices and systems that can help achieve low ecological impact (e.g., energy monitoring devices), etc. Alternatively, process 1300 can generate a recommendation as to how the user can alter her behavior to achieve a lower carbon footprint. For instance, such a recommendation can be to purchase more locally produced products so as to reduce a carbon footprint associated with transportation of products that the user normally purchases. As another example, the generated recommendation can be, for previously purchased products serving as replenishments for depleted ones, to walk to a local hub at which those products can be picked up in person (as opposed to having the products delivered by a carbon producing vehicle). Yet another example can be for the user to install more energy efficient appliances in her home or business. In some implementations, one or more of the award and the recommendation can be accompanied by a ranking of activities producing the award or recommendation. That is, the ranking can be an indication (e.g., a listing) of a highest ranked activity that caused the award or recommendation to be generated. As an example, an award can indicate that the user has minimized carbon footprint due to repeatedly observing recycling procedures (i.e., a highest ranked activity for the user's award). As another example, a recommendation can indicate that the user's ecological impact score would benefit by the user recycling more frequently (i.e., the highest ranked activity for the user's recommendation). Thus, whether in the form of an award or a recommendation, process 1300 can promote behavior of a user that can be instrumental for reducing that user's ecological impact.

At block 1314, process 1300 can notify the user of the award or recommendation generated at block 1312. For example, a notification can be in real-time and in form of a text message, an email, an automated telephone call, a mobile device in-app or push notification, a pop-up message or other type of alert on the user's internet browser. In a particular case, the user can receive, for instance, a discount code while engaging in online shopping that can be applied toward the future purchase of one or more products that can have a lesser ecological impact than other products. In another case, a user can receive, perhaps via a heads-up display (HUD) of the user's vehicle, a recommendation to obtain gasoline before it is depleted, where the depletion could cause the need for towing services that can increase an overall carbon footprint due to operation of the towing vehicle.

Figure 14:
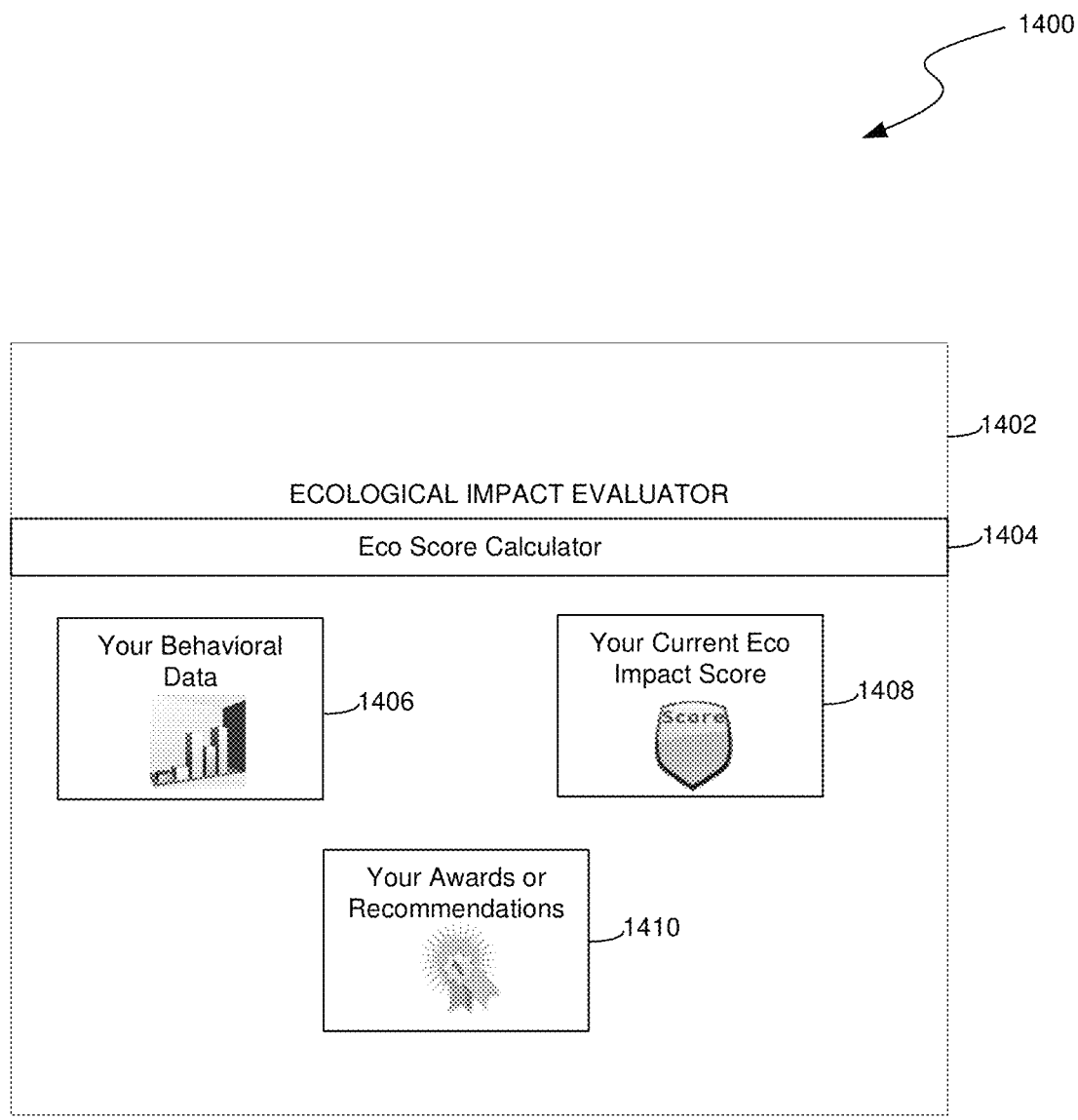
FIG. 14 is a conceptual diagram illustrating, according to implementations of the present technology, a UI ecological score calculator element according to an ecological impact evaluator executing the process of FIG. 13.

FIG. 14 is a conceptual diagram 1400 illustrating, according to implementations of the present technology, a UI ecological score calculator element as an "Eco Score Calculator" 1404 for an ecological impact evaluator 1402 executing process 1300 of FIG. 13. The calculator 1404 can provide a user a selection for "Your Behavioral Data" 1406, where the user can be informed of her past and future actions for affecting her ecological impact. In view of these actions, the calculator 1404 can, for instance, execute blocks 1304, 1308, and 1310 of process 1300 to provide a selection for "Your Current Eco Impact Score" 1408 to enable the user to gauge progress for reducing her ecological impact. To do so, the selection 1408 can provide a user an itemization for scoring for past and future actions (e.g., past and future purchases) and an overall ecological impact score. In association with the scoring, the calculator 1404 can further present a selection for "Your Awards or Recommendations" 1410, where the user can be made aware of, as is discussed above with reference to block 1314 of FIG. 13, one or more incentives (i.e., awards) or actions, in the form of recommendations, for promoting behavior of a user that can decrease her ecological impact.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of scoring ecological impact, the method comprising:
automatically obtaining first behavioral data and second behavioral data corresponding to activities of a user, wherein
the first behavioral data is related to water usage, is automatically obtained via a first smart device integrated with one or more water devices and systems in the user's home or business, and is from one or more water consumption devices and/or one or more water supply systems; and
the second behavioral data is related to energy usage and is automatically obtained via a second smart device integrated with one or more energy devices in the user's home or business; and
using one or more computer processors:
determining, by applying the first behavioral data to a mapping of water source to water usage, water usage patterns comprising: a) a source type for the water usage patterns, and b) timings of the water usage patterns;
calculating a first water ecological impact score based on a comparison, using the determined water usage patterns and for each determined source type, water usage of that source type to water allocations for that source type;
calculating, based on a mapping of the activities to ecological impact scores, one or more second water ecological impact scores;
calculating, using the second behavioral data, a first energy ecological impact score;
based on the first water ecological impact score and one or more second water ecological impact scores, generating an altered operating schedule for an irrigation system or home appliance, wherein the operating schedule of the irrigation system or home appliance is controlled via a third smart device based on weather data, and the altered operating schedule changes, via implementation by the third smart device, the determined water usage patterns; and
based on the first energy ecological impact score, generating one or more recommendations comprising an alteration to energy usage patterns in relation to the user's home or business.

2. The method of claim 1, wherein each of the first and second water ecological impact scores of the user defines a carbon footprint for the user.

3. The method of claim 1, further comprising:
automatically obtaining third behavioral data corresponding to the activities of the user,
wherein the activities of the user comprise product purchasing activity of the user,
wherein the third behavioral data is automatically obtained based on a monitoring of the user's online internet activity or a real-time imaging of products purchased or products for a prospective purchase, and
wherein one or more third ecological impact scores are calculated based on the third behavioral data.

4. The method of claim 3,
wherein the third behavioral data is automatically obtained based on real-time imaging of products for a prospective purchase,
wherein the one or more third ecological impact scores are calculated by comparing features of at least one of the imaged products for the prospective purchase to features of a similar product from a monitored purchase history for the user, and
wherein one or more additional recommendations are generated based on the third ecological impacts score, the additional recommendations comprising a recommendation to purchase an alternative product to the at least one imaged product.

5. The method of claim 1, further comprising:
automatically obtaining third behavioral data corresponding to the activities of the user,
wherein the activities of the user comprise recycling and composting activities of the user, wherein the third behavioral data is automatically obtained via a counter that counts a number of times a product packaging configuration is imaged for each of the respective activities, and wherein one or more third ecological impact scores are calculated based on the third behavioral data.

6. The method of claim 1, further comprising:
automatically obtaining third behavioral data corresponding to the activities of the user,
wherein the activities of the user comprise driving practices of the user,
wherein the third behavioral data is automatically obtained via a sensor of a vehicle of the user or a wearable of the user, and
wherein one or more third ecological impact scores are calculated based on the third behavioral data.

7. The method of claim 1, further comprising:
notifying the user of the altered operating schedule and/or one or more recommendations in real-time by one or more of a text message, an email, a telephone call, a push notification, an online alert, or any combination thereof.

8. The method of claim 1, wherein the first behavioral data is automatically obtained via: the first smart device that is integrated with one or more water consumption devices in the user's home or business, and a fourth smart device that is integrated with one or more water supply systems in the user's home or business.

9. The method of claim 1, wherein the altered operating schedule is based on a water usage budget configured to spread water usage across different source types and alter water usage patterns.

10. The method of claim 1, wherein the altered operating schedule is for the irrigation system, and the third smart device controls the irrigation system.

11. A computing system for scoring ecological impact, the computing system comprising:
one or more processors; and
one or more memories storing instructions that, when executed by the one or more processors, cause the computing system to perform a process comprising:
automatically obtaining first behavioral data and second behavioral data corresponding to activities of a user, wherein
the first behavioral data is related to water usage, is automatically obtained via a first smart device integrated with one or more water devices and systems in the user's home or business, and is from one or more water consumption devices and/or one or more water supply systems; and
the second behavioral data is related to energy usage and is automatically obtained via a second smart device integrated with one or more energy devices in the user's home or business;
determining, by applying the first behavioral data to a mapping of water source to water usage, water usage patterns comprising: a) a source type for the water usage patterns, and b) timings of the water usage patterns;
calculating a first water ecological impact score based on a comparison, using the determined water usage patterns and for each determined source type, water usage of that source type to water allocations for that source type;
calculating, based on a mapping of the activities to ecological impact scores, one or more second water ecological impact scores;
calculating, using the second behavioral data, a first energy ecological impact score;
based on the first water ecological impact score and one or more second water ecological impact scores, generating an altered operating schedule for an irrigation system or home appliance, wherein the operating schedule of the irrigation system or home appliance is controlled via a third smart device based on weather data, and the altered operating schedule changes, via implementation by the third smart device, the determined water usage patterns; and
based on the first energy ecological impact score, generating one or more recommendations comprising an alteration to energy usage patterns in relation to the user's home or business.

12. The computing system of claim 11, wherein each of the first and second water ecological impact scores of the user defines a carbon footprint for the user.

13. The computing system of claim 11, further comprising:
automatically obtaining third behavioral data corresponding to the activities of the user,
wherein the activities of the user comprise product purchasing activity of the user,
wherein the third behavioral data is automatically obtained based on a monitoring of the user's online internet activity or a real-time imaging of products purchased or products for a prospective purchase, and
wherein one or more third ecological impact scores are calculated based on the third behavioral data.

14. The computing system of claim 11, wherein the process further comprises:
automatically obtaining third behavioral data corresponding to the activities of the user,
wherein the activities of the user comprise recycling and composting activities of the user,
wherein the third behavioral data is automatically obtained via a counter that counts a number of times a product packaging configuration is imaged for each of the respective activities, and
wherein one or more third ecological impact scores are calculated based on the third behavioral data.

15. The computing system of claim 11, wherein the process further comprises:
automatically obtaining third behavioral data corresponding to the activities of the user,
wherein the activities of the user comprise driving practices of the user,
wherein the third behavioral data is automatically obtained via a sensor of a vehicle of the user or a wearable of the user, and
wherein one or more third ecological impact scores are calculated based on the third behavioral data.

16. The computing system of claim 11, wherein the process further comprises notifying the user of the altered operating schedule and/or the one or more recommendations in real-time with the performance of the activities of the user.

17. A non-transitory machine-readable storage medium having machine-executable instructions stored thereon that, when executed by one or more processors, cause one or more processors to perform a method for scoring ecological impact, the method comprising:
automatically obtaining first behavioral data and second behavioral data corresponding to activities of a user, wherein, the first behavioral data is related to water usage, is automatically obtained via a first smart device integrated with water devices and systems in the user's home or business, and is from water consumption devices and/or water supply systems; and the second behavioral data is related to energy usage and is automatically obtained via a second smart device integrated with one or more energy devices in the user's home or business;

determining, by applying the first behavioral data to a mapping of water source to water usage, water usage patterns comprising: a) a source type for the water usage patterns, and b) timings of the water usage patterns;

calculating a first water ecological impact score based on a comparison, using the determined water usage patterns and for each determined source type, water usage of that source type to water allocations for that source type;

calculating, based on a mapping of the activities to ecological impact scores, one or more second water ecological impact scores;

calculating, using the second behavioral data, a first energy ecological impact score;

based on first ecological impact score and one or more second ecological impact scores, generating an altered operating schedule for an irrigation system or home appliance, wherein the operating schedule of the irrigation system or home appliance is controlled via a third smart device based on weather data, and the altered operating schedule changes, via implementation by the third smart device, the determined water usage patterns; and based on the first energy ecological impact score, generating one or more recommendations comprising an alteration to energy usage patterns in relation to the user's home or business.

18. The non-transitory machine-readable storage medium of claim 17, wherein each of the first and second water ecological impact scores of the user defines a carbon footprint for the user.

19. The non-transitory machine-readable storage medium of claim 17, wherein the method further comprises:
automatically obtaining third behavioral data corresponding to the activities of the user,
wherein the activities of the user comprise product purchasing activity of the user, and
wherein the third behavioral data is automatically obtained based on a monitoring of the user's online internet activity or a real-time imaging of products purchased or products for a prospective purchase, and
wherein one or more third ecological impact scores are calculated based on the third behavioral data.

20. The non-transitory machine-readable storage medium of claim 17, wherein the method further comprises:
automatically obtaining third behavioral data corresponding to the activities of the user,
wherein the activities of the user comprise recycling and composting activities of the user,
wherein the third behavioral data is automatically obtained via a counter that counts a number of times a product packaging configuration is imaged for each of the respective activities, and
wherein one or more third ecological impact scores are calculated based on the third behavioral data.

* * * * *